(12) United States Patent
Call

(10) Patent No.: US 9,544,329 B2
(45) Date of Patent: *Jan. 10, 2017

(54) CLIENT/SERVER SECURITY BY AN INTERMEDIARY EXECUTING INSTRUCTIONS RECEIVED FROM A SERVER AND RENDERING CLIENT APPLICATION INSTRUCTIONS

(71) Applicant: Shape Security, Inc., Mountian View, CA (US)

(72) Inventor: Justin Call, Santa Clara, CA (US)

(73) Assignee: Shape Security, Inc., Mountain View, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 14/218,598

(22) Filed: Mar. 18, 2014

(65) Prior Publication Data

US 2015/0271188 A1 Sep. 24, 2015

(51) Int. Cl.
  *G06F 15/16* (2006.01)
  *H04L 29/06* (2006.01)
  *H04L 29/08* (2006.01)

(52) U.S. Cl.
  CPC ........ *H04L 63/145* (2013.01); *H04L 63/0281* (2013.01); *H04L 63/08* (2013.01); *H04L 63/1408* (2013.01); *H04L 67/02* (2013.01); *H04L 67/2819* (2013.01); *H04L 67/42* (2013.01); *H04L 67/2823* (2013.01); *H04L 69/22* (2013.01)

(58) Field of Classification Search
  CPC .... H04L 63/145; H04L 63/08; H04L 63/1408; H04L 63/0281; H04L 67/02; H04L 67/2819; H04L 67/42; H04L 67/2823; H04L 69/22
  USPC ................................ 726/5, 4, 7, 26; 713/153
  See application file for complete search history.

(56) References Cited

U.S. PATENT DOCUMENTS 6,401,077 B1   6/2002  Godden et al.
6,938,170 B1 *  8/2005  Kraft ................... G06F 17/3089
                                        707/999.005

(Continued)

FOREIGN PATENT DOCUMENTS

CN      101471818 A      7/2009
CN    101471818K2        5/2011

(Continued)

OTHER PUBLICATIONS

Rieck et al., "Cujo: Efficient Detection and Prevention of Drive-by-Download Attacks", ACSAC, Dated Dec. 2010, 9 pages.

(Continued)

*Primary Examiner* — Thu Ha Nguyen
(74) *Attorney, Agent, or Firm* — Hickman Palermo Becker Bingham LLP

(57) ABSTRACT

In an embodiment, a method comprises intercepting, from a server computer, a first set of instructions that define a user interface; executing, using a headless browser, the first set of instructions without presenting the user interface; rendering a second set of instructions, which when executed by a client application on a client computer, cause the client computer to present the user interface, wherein the second set of instructions are different than the first set of instructions; sending the second set of instructions to the client computer.

19 Claims, 9 Drawing Sheets

(56) References Cited

U.S. PATENT DOCUMENTS

| | | | |
|---|---|---|---|
| 7,117,429 B2 | 10/2006 | Vedullapalli et al. | |
| 7,464,326 B2 | 12/2008 | Kawai et al. | |
| 7,500,099 B1 | 3/2009 | McElwee et al. | |
| 7,707,223 B2 | 4/2010 | Zubenko | |
| 7,840,996 B1* | 11/2010 | Wu | H04L 63/0272 707/828 |
| 7,895,653 B2 | 2/2011 | Calo et al. | |
| 8,020,193 B2 | 9/2011 | Bhola et al. | |
| 8,086,957 B2 | 12/2011 | Bauchot et al. | |
| 8,132,242 B1* | 3/2012 | Wu | H04L 63/0884 713/168 |
| 8,225,401 B2 | 7/2012 | Sobel et al. | |
| 8,266,202 B1 | 9/2012 | Colton et al. | |
| 8,266,243 B1 | 9/2012 | Carlson et al. | |
| 8,332,952 B2 | 12/2012 | Zhang et al. | |
| 8,346,966 B1* | 1/2013 | Phatak | H04L 67/06 709/245 |
| 8,347,396 B2 | 1/2013 | Grigsby et al. | |
| 8,392,576 B1 | 3/2013 | Henderson | |
| 8,516,080 B2 | 8/2013 | Chow et al. | |
| 8,527,774 B2 | 9/2013 | Fallows et al. | |
| 8,533,480 B2 | 9/2013 | Pravetz et al. | |
| 8,555,385 B1 | 10/2013 | Bhatkar et al. | |
| 8,555,388 B1 | 10/2013 | Wang et al. | |
| 8,627,479 B2 | 1/2014 | Wittenstein et al. | |
| 8,788,805 B2* | 7/2014 | Herne | H04L 63/0428 713/153 |
| 8,892,687 B1 | 11/2014 | Call | |
| 8,954,583 B1 | 2/2015 | Zhou et al. | |
| 9,009,332 B1* | 4/2015 | Remizov | H04L 63/0281 709/227 |
| 9,178,934 B1* | 11/2015 | Kolam | H04L 67/2823 |
| 9,311,284 B2* | 4/2016 | Warila | |
| 9,407,727 B1* | 8/2016 | Mccanne | H04L 67/42 |
| 2002/0056006 A1 | 5/2002 | Vange et al. | |
| 2002/0178299 A1* | 11/2002 | Teubner | G06F 9/546 719/320 |
| 2002/0188631 A1 | 12/2002 | Tiemann et al. | |
| 2004/0133848 A1 | 7/2004 | Hunt et al. | |
| 2004/0245525 A1 | 12/2004 | Yamazaki et al. | |
| 2005/0160161 A1* | 7/2005 | Barrett | H04L 63/20 709/223 |
| 2006/0005008 A1* | 1/2006 | Kao | H04L 63/0272 713/153 |
| 2006/0031855 A1 | 2/2006 | Smithline et al. | |
| 2006/0053295 A1 | 3/2006 | Madhusudan et al. | |
| 2007/0011295 A1 | 1/2007 | Hansen | |
| 2007/0064617 A1 | 3/2007 | Reves | |
| 2008/0222736 A1 | 9/2008 | Boodaei et al. | |
| 2008/0320586 A1 | 12/2008 | Hrabik et al. | |
| 2009/0007243 A1* | 1/2009 | Boodaei | H04L 9/3226 726/5 |
| 2009/0099988 A1 | 4/2009 | Stokes et al. | |
| 2009/0193513 A1 | 7/2009 | Agarwal et al. | |
| 2009/0241174 A1* | 9/2009 | Rajan | G06F 21/31 726/5 |
| 2009/0292984 A1 | 11/2009 | Bauchot et al. | |
| 2010/0082774 A1* | 4/2010 | Pitts | G06F 17/30144 709/219 |
| 2010/0100927 A1 | 4/2010 | Bhola et al. | |
| 2010/0115594 A1 | 5/2010 | Paya et al. | |
| 2010/0125612 A1 | 5/2010 | Amradkar et al. | |
| 2010/0186089 A1 | 7/2010 | Fu et al. | |
| 2010/0235637 A1 | 9/2010 | Lu et al. | |
| 2010/0235910 A1 | 9/2010 | Ku et al. | |
| 2010/0257354 A1 | 10/2010 | Johnston et al. | |
| 2010/0262780 A1 | 10/2010 | Mahan et al. | |
| 2011/0047169 A1 | 2/2011 | Leighton et al. | |
| 2011/0131416 A1 | 6/2011 | Schneider | |
| 2011/0154021 A1 | 6/2011 | McCann et al. | |
| 2011/0178973 A1 | 7/2011 | Lopez et al. | |
| 2011/0239113 A1 | 9/2011 | Hung et al. | |
| 2011/0252305 A1 | 10/2011 | Tschani et al. | |
| 2011/0283110 A1 | 11/2011 | Dapkus et al. | |
| 2011/0296391 A1 | 12/2011 | Gass et al. | |
| 2011/0302623 A1 | 12/2011 | Ricci | |
| 2011/0320816 A1 | 12/2011 | Yao et al. | |
| 2012/0011262 A1 | 1/2012 | Cheng et al. | |
| 2012/0022942 A1* | 1/2012 | Holloway | H04L 67/146 705/14.49 |
| 2012/0023394 A1 | 1/2012 | Pieczul et al. | |
| 2012/0059742 A1 | 3/2012 | Katzin et al. | |
| 2012/0096116 A1 | 4/2012 | Mislove et al. | |
| 2012/0117649 A1 | 5/2012 | Holloway et al. | |
| 2012/0124372 A1 | 5/2012 | Dilley et al. | |
| 2012/0137375 A1 | 5/2012 | Ramachandran et al. | |
| 2012/0173870 A1 | 7/2012 | Reddy et al. | |
| 2012/0174218 A1 | 7/2012 | McCoy et al. | |
| 2012/0198528 A1 | 8/2012 | Baumhof | |
| 2012/0216251 A1 | 8/2012 | Kumar et al. | |
| 2013/0091582 A1 | 4/2013 | Chen et al. | |
| 2013/0179981 A1* | 7/2013 | Bekker | H04L 63/0823 726/26 |
| 2013/0198607 A1 | 8/2013 | Mischook et al. | |
| 2013/0219256 A1 | 8/2013 | Lloyd et al. | |
| 2013/0219492 A1 | 8/2013 | Call et al. | |
| 2013/0227397 A1 | 8/2013 | Tvorun et al. | |
| 2013/0232234 A1 | 9/2013 | Kapur et al. | |
| 2013/0263264 A1 | 10/2013 | Klein et al. | |
| 2013/0340043 A1 | 12/2013 | Zarei et al. | |
| 2014/0040787 A1 | 2/2014 | Mills et al. | |
| 2014/0053059 A1 | 2/2014 | Weber et al. | |
| 2014/0089786 A1 | 3/2014 | Hashmi | |
| 2014/0129920 A1 | 5/2014 | Sheretov et al. | |
| 2014/0172911 A1 | 6/2014 | Cohen et al. | |
| 2014/0189499 A1 | 7/2014 | Gigliotti | |
| 2014/0189808 A1* | 7/2014 | Mahaffey | H04L 63/0853 726/4 |
| 2014/0223290 A1 | 8/2014 | Hathaway | |
| 2014/0280515 A1* | 9/2014 | Wei | H04L 67/02 709/203 |
| 2014/0281535 A1 | 9/2014 | Kane | |
| 2015/0088968 A1* | 3/2015 | Wei | H04L 67/10 709/203 |
| 2015/0178769 A1* | 6/2015 | Mirisola | H04L 63/0421 705/14.45 |
| 2016/0048868 A1* | 2/2016 | Mirisola | G06Q 30/02 705/14.44 |
| 2016/0212101 A1* | 7/2016 | Reshadi | H04L 63/0414 |

FOREIGN PATENT DOCUMENTS

| | | |
|---|---|---|
| GB | 2443093 A | 4/2008 |
| WO | WO9964967 A1 | 12/1999 |
| WO | WO02088951 A1 | 11/2002 |
| WO | WO2004109532 A1 | 12/2004 |
| WO | WO2008095018 A2 | 8/2008 |
| WO | WO2008095031 A1 | 8/2008 |
| WO | WO2008130946 A2 | 10/2008 |
| WO | WO2013091709 A1 | 6/2013 |

OTHER PUBLICATIONS

Pattabiraman et al., "DoDOM: Leveraging DOM Invariants for Web 2.0 Application Robustness Testing" dated 2010, IEEE, 10 pages.

International Searching Authority, "Search Report" in application No. PCT/US2014/024232, dated Aug. 1, 2014, 52 pages.

International Searching Authority, "Search Report" in application No. PCT/2014/027805, dated Aug. 18, 2014, 14 pages.

International Searching Authority, "Search Report" in application No. PCT/2014/023897, dated Jul. 18, 2014, 15 pages.

International Searching Authority, "Search Report" in application No. PCT/2014/027805, dated Aug. 14, 2014, 14 pages.

H. Krawczyk, "HMAC-Based Extract-And-Expand Key Derivation Function, (HKDF)", RFC 5869, IETF, May 2010, 10 pages.

Dougan et al., International Journal of Ambient Computing and Intelligence, dated Jan.-Mar. 2012, pp. 29-39.

D. Kristol, "HTTP State Management Mechanism", RFC 2965, IETF, dated Oct. 2000, 19 pages.

(56) References Cited

OTHER PUBLICATIONS

Currie et al., In-the-Wire Authentication: Protecting Client-Side Critical Data Fileds in Secure Network Transactions, dated 2009 2nd International Con. Adapt. Science & Tech. IEEE, pp. 232-237.
U.S. Appl. No. 14/290,835, filed May 29, 2014, Final Office Action, Dec. 30, 2014.
U.S. Appl. No. 14/290,805, filed May 29, 2014, Final Office Action, Jan. 14, 2015.
U.S. Appl. No. 14/290,805, filed May 29, 2014, Interview Summary, Dec. 10, 2014.
International Searching Authority, "Search Report" in application No. PCMS15/32060, dated Aug. 25, 2015, 10 pages.
Rutkowska, "Rootkits vs. Stealth by Design Malware," Black Hat Europe, 2006. Retrieved from the Internet.
CodeSealer, "CodeSealer," codesealer.com [online] 2013 [captured Aug. 29, 2013]. Retrieved from the Internet.
Cova et al., "Detection and Analysis of Drive-by-Download Attacks and Malicious JavaScript Code," World Wide Web Conference Committee, Apr. 26-30, 2010.
Egele et al., Defending Browsers against Drive-by Downloads: Mitigating Heap-spraying Code Injection Attacks.
Entrust, "Defeating Man-in-the-Browser Malware," Entrust.com [online] Sep. 2012 [retrieved Oct. 15, 2013]. Retrieved from the Internet.
Krebs on Security, In-depth security news and investigation, "A Closer Look at Rapport from Trusteer", dated Apr. 29, 2010.
Marcus and Sherstobitoff, "Dissecting Operation High Roller," McAfee [online] 2012 [retrieved on Oct. 15, 2013]. Retrieved from the Internet.
Anderson et al., "Measuring the Cost of Cybercrime," 2012 Workshop on the Economics of Information Security (WEIS), [retrieved on Oct. 15, 2013].
RSA, "RSA Offers Advanced Solutions to Help Combat Man-In-The-Browser Attacks," rsa.com [online] May 18, 2010 [captured Nov. 11, 2011].
Vasco, "Hardened Browser," vasco.com [online] [retrieved on Oct. 15, 2013]. Retrieved from the Internet: <URL: http://www.vasco.com/products/client_products/pki_digipass/hardened_browser.aspx>, 2 pages.
SafeNet, "Prevent Financial Fraud and Man-in-the-Browser Attacks," safenet-inc.com [online] [retrieved on Oct. 15, 2013].
Sood and Enbody, "A Browser Malware Taxonomy," Virus Bulletin, Jun. 2011. Retrieved from the Internet: <URL:http://www.secniche.org/released/VB_BRW_MAL_TAX_AKS_RJE.pdf>, 5 pages.
Sood and Enbody, "Browser Exploit Packs—Exploitation Tactics," Virus Bulletin Conference, Oct. 2011, Retrieved from the Internet.
Sood et al., "The Art of Stealing Banking Information—Form grabbing on Fire," Virus Bulletin, Nov. 2011, Retrieved from the Internet.
Team Cymru, "Cybercrime—an Epidemic," Queue, 4(9):24-35, Nov. 2006, Retrieved from the Internet.
Trusteer, "Trusteer Rapport", "Endpoint-centric Fraud Prevention", from the web http://www.trusteer.com/products/trusteer-rapport, last accessed on Jan. 9, 2013, 2 pages.
Oh, "Recent Java exploitation trends and malware," Black Hat USA 2012, Retrieved from the Internet.
USPTO, Office Action in U.S. Appl. No. 14/286,733, notified Jul. 14, 2014, 17 pages.
IP.com, "Search Results", Patents and Applications, http://ip/com/search/results.html, dated May 6, 2014, 2 pages.
Google Search, "Google Patents Search Results" dated May 21, 2014, 2 pages.
U.S. Appl. No. 14/481,835, filed Sep. 9, 2014, Office Action, Oct. 28, 2015.
Wikipedia Online, "List of HTTP Header Fields", dated Jun. 18, 2014, Retrieved from internet https://en.wikipedia/org/w/index.php?title=List of HTTP_header_fields&oldid=613421878>, 11 pages.
Shackleford, D. "Application Whitelisting: Enhancing Host Security," SANS Institute Reading Room, Oct. 2009, 16 pages.
Indiana University [online]. "Authentication vs. Authorization," published before Jul. 1, 2014, Internet: <URL: https://protect.iu.edu/cybersecurity/authn-authz>. 2 pages.
Hueniverse Online, "Introduction" published before Jul. 1, 2014, retrieved on Jul. 1, 2014 from the internet http://huniverse.com/oauth/guide/into>4pages.
D Hardt, "The Oauth 2.0 Authorization Framework", Internet Engineering Task Force, dated Oct. 2012, 76 pages.
Boston University Information Services & Technology [online]. "Understanding Authentication, Authorization, and Encryption," www.bu.edu/tech/services/security/resources/bestpractice/auth, Jul. 2014 4pgs.
European Patent Office, "Search Report" in application No. PCT/US2016/030462, dated Jul. 28, 2016, 16 pages.
European Claims in application No. PCT/US2016/030462, dated Jul. 2016, 6 pages.

* cited by examiner

US 9,544,329 B2

CLIENT/SERVER SECURITY BY AN INTERMEDIARY EXECUTING INSTRUCTIONS RECEIVED FROM A SERVER AND RENDERING CLIENT APPLICATION INSTRUCTIONS

FIELD OF THE DISCLOSURE

The present disclosure generally relates to security techniques applicable to client/server systems, and relates more specifically to techniques for improving the security of client computers interacting with server computers through an intermediary computer.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Browsers are powerful computer program applications that may execute instructions, received from a web server, to generate complex user interfaces that are presented to a user through one or more devices, such as a display monitor or speakers. Perpetrators of fraud or theft ("fraudsters") may inject malicious instructions, which when executed by a browser, may cause, among other things, sensitive data to be sent to an unknown party, the client computer to be used for a cyber-attack, or malware to be installed on the client computer.

Browsers prevent some malware from being installed on a client computer by limiting functionality. For example, a browser, executing on a client computer, may restrict a JavaScript run-time environment from accessing files stored on the client computer. However, fraudsters regularly find new ways to embed malicious software through a browser. For example, a fraudster may embed a key-logger program into an image file. After a browser downloads an image file referenced in a web page, the browser may store the image on the client computer. Opening the image file may cause executing the key-logger on the client computer. The key-logger may record data indicating each keystroke a user makes regardless of which program the user is currently using on the computer. The key-logger can send the recorded data back to the fraudster.

SUMMARY

The appended claims may serve as a summary of the invention.

Figure 1:
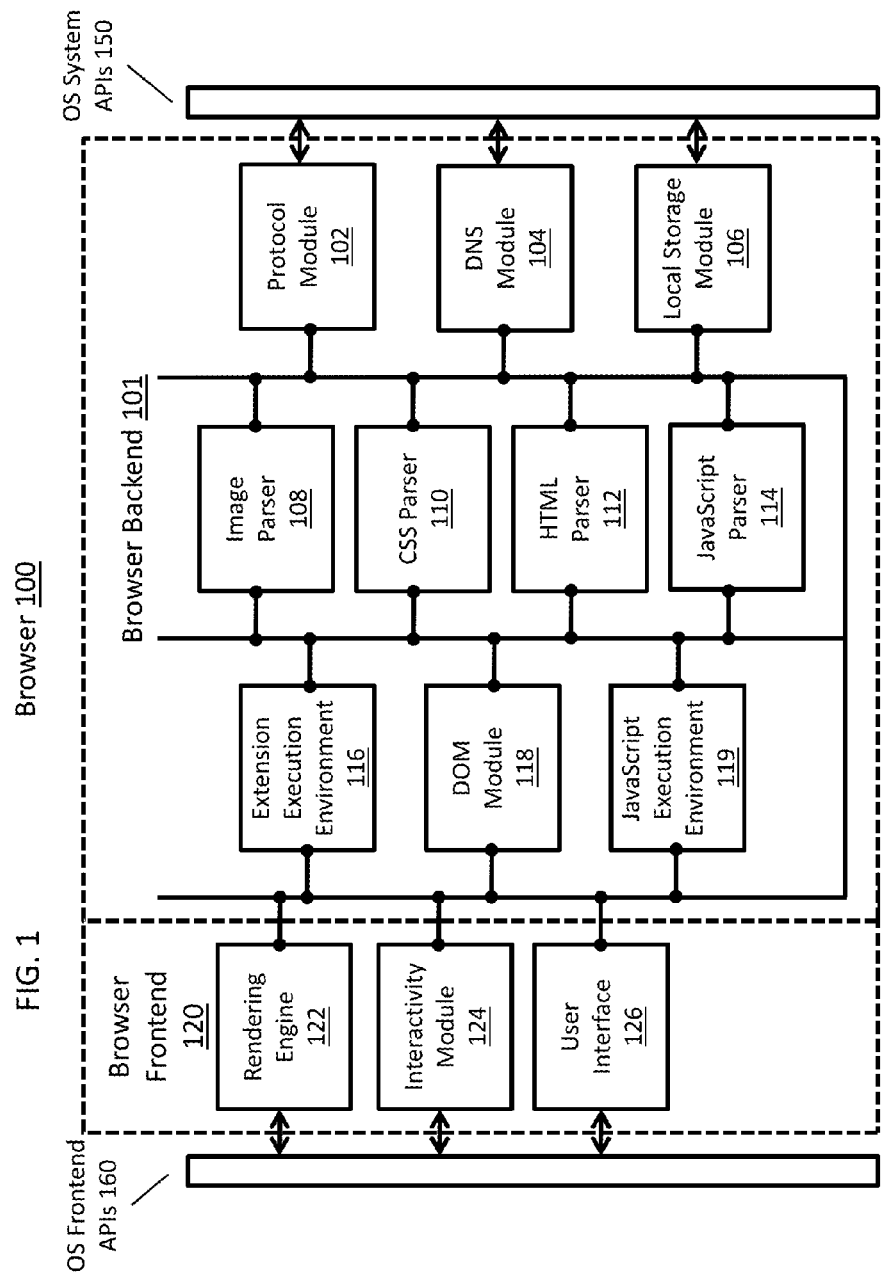
FIG. 1 illustrates functional units of a web browser in an example embodiment.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments. Furthermore, while the instructions discussed in many example embodiments are HTML, JavaScript, and CSS instructions, in other embodiments, the instructions intercepted and generated by the headless browser need not be HTML, JavaScript, and/or CSS instructions.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 Terms
2.0 General Overview
3.0 Separating Functional Components in a Browser
   3.1 Browser Backend
   3.2 Browser Frontend
4.0 Network Topology
   4.1 Web Infrastructure
   4.2 Headless Browser
      4.2.1 Protocol Client
      4.2.2 Browser Backend
      4.2.3 Forward Transformer
      4.2.4 Protocol Server Module
      4.2.5 Transaction Store
      4.2.6 Reverse Transformer
      4.2.7 Configurations
   4.3 Client Application
      4.3.1 Security Module
5.0 Process Overview
   5.1 Intercepting Instructions from a Content Server Computer
   5.2 Rendering New, Different Instructions
      5.2.1 Validating a Headless Browser
      5.2.2 Validating a Client Application
   5.3 Sending and Performing the Received Instructions
   5.4 Requesting Additional Instructions
6.0 An Example Process to Manage a Bank Account through a Hardened Client Application and a Headless Browser 7.0 Mitigating Risk of Infecting a Group's Internal Server Computer
8.0 Implementation Mechanisms—Hardware Overview
9.0 Other Aspects of Disclosure

1.0 TERMS

For certain embodiments, some of the terms used herein may have some of the following meanings, among others:

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

A "browser" may be one or more computer programs or other software elements stored in electronic digital memory and running on a computer that receives instructions from a server computer, performs one or more of the received instructions, causes to display content, provides a user interface ("UI") to receive user inputs, and/or receives and responds to one or more inputs from a user based on or according to the one or more performed instructions. A browser and/or components of a browser may be implemented into an application. For example, a browser and/or components of a browser may be implemented into a mobile application as part of a web view, and/or web view controller, to send and/or receive data over HTTP and/or other protocol. A user may use a browser to send data to a server computer. The server computer may respond with additional instructions.

A "web browser" may be a browser that receives instructions comprising HTML, CSS, and/or JavaScript over HTTP or some derivative thereof, such as HTTPS.

A "headless browser" may be one or more computer programs or software elements executed on a computer that receives a set of instructions from a server computer, performs one or more of the received instructions, generates a different set of instructions, and/or sends the different set of instructions to a client application executed on a separate computer. Additionally or alternatively, a headless browser need not cause presenting a UI to a user at the computer that the headless browser is running on according to the received set of instructions and/or the rendered set of instructions. Additionally or alternatively, a headless browser need not provide a user interface ("UI") to receive user inputs and/or respond to user inputs according to the set of received, executed instructions. Additionally or alternatively, a headless browser may receive, and/or respond to, data received from a client application. The data received from the client application may be generated by the client application in response to a user input. Additionally or alternatively, a headless browser may implement one or more security mechanisms to verify the integrity of one or more communicatively coupled client applications.

A "client application" may be one or more computer programs or software elements executed on a computer, which when executed causes the computer to present a UI to a user based on instructions received from a server computer and/or headless browser.

A "hardened client application" may be a client application that presents a UI to a user based on specialized instructions received from a headless browser. A hardened client application may comprise a browser and/or components of a browser. A hardened client application may implement one or more one or more security mechanisms to verify the validity of a headless browser.

"Specialized instructions" or "application instructions" may mean one or more instructions sent from a headless browser to a client application, which the client application is programmed to process.

"Presenting a UI" or "providing a UI" may mean visually displaying or rendering graphical images of objects that are defined in a set of received instructions according to the received set of instructions. Additionally or alternatively, presenting may mean playing audio or other multimedia content to a user according to a received set of instructions. Additionally or alternatively, presenting an UI or providing a UI may mean providing a UI to receive user inputs and/or respond to user inputs according to a set of received, executed instructions.

"Sending and/or receiving data over HTTP" may mean sending and/or receiving data and/or instructions using HyperText Transfer Protocol. Additionally or alternatively, "sending and/or receiving data over HTTP" may mean sending and/or receiving data and/or instructions using a subset of the HTTP, such as secure HTTP (HTTPS). Additionally or alternatively, one or more other protocols may be used, such as SPDY and/or a long-running socket.

A "long-running socket" between may be a socket that remains open for either a client computer and/or a server computer to send and/or receive data over an indefinite period of time. For example, after a server computer sends instructions to a client computer using a long-running socket, the server computer need not close the long-running socket. Additionally or alternatively, after the client computer sends data to server computer, the client computer need not close the long-running socket. Accordingly, using a long-running socket a client computer and server computer need not open a new socket to each time either sends and/or receives data from the other. A long-running socket may implement a standard protocol, such as web sockets, or a proprietary protocol.

An "object" may be a data structure that can be identified by an identifier and/or a relationship with another object. For example, an object may have a unique identifier that is a string, such as a document, customer number, username, address, and/or offset. Accordingly, the object may be referenced and/or retrieved using the identifier. Also for example, if a particular object is the first child object of a parent object, then the particular object may be referenced and/or retrieved using a pointer to the parent object and then retrieving a pointer to the first child object. A method of referencing objects by identifier and/or relationships is called XPath. An object may be a particular type of object. For example, one object may be a button, another object may be an input, or specifically a text field, and another object may be an image.

An "attribute" may be data that identifies and/or describes the appearance, behavior, and/or content of an object. For example, an attribute may be a unique identifier, such as a name. An attribute may indicate that an object is a type of input, such as a text field, text area, checkbox, and/or radio button. An attribute may indicate that an object is a password text field; accordingly, a client application rendering the text field object on a monitor need not cause the characters that are entered into the field object to be displayed. An attribute associated with the text field object may be updated to include the value entered in the text field. Other attributes may define or describe dimension, position, color, visibility, value, and any other functional or visual aspect of an object.

A "document object model" ("DOM") may be a cross-platform and language-independent representation of one or more objects that are interrelated. For example, a DOM may represent one or more objects in an object tree and/or hierarchy. An object within the hierarchy may be a parent object, which has one or more child objects. A child object may also have one or more child objects.

"Creating, updating, and/or removing an object" may mean creating, updating, and/or removing a data structure in memory that represents an object, an object's attributes, and/or relationships between an object and one or more other objects; because these processes directly or indirectly involve changing the state of registers or other structures in electronic digital memory circuits, the processes necessarily involve using a computer to transform the state of tangible things.

An "operation" may be any function, method, script, and/or any other code, which when executed operates on an object.

"Operating on an object" may mean creating, removing, and/or updating an object. Additionally, "operating on an object" may mean performing one or more operations that use an object, attribute, and/or relationship between an object and one or more other objects as input.

"Instructions" may mean one or more codes and/or data that define one or more objects and/or one or more operations. For example, instructions may comprise HyperText Markup Language ("HTML"), eXtensible Markup Language ("XML"), cascading style sheets ("CSS"), JavaScript, and/or any other standard or proprietary languages or codes that define objects, attributes, relationships between objects, and/or operations.

"Performing instructions" or "executing instructions" may mean creating one or more objects and/or performing one or more operations defined by the instructions.

"Rendering instructions" may mean generating one or more instructions. The rendered instructions may be based on objects and/or operations stored in memory, such that when the generated one or more instructions are executed the same objects and/or same operations are created in memory.

A first object may be the "same" as a second object if the first object maintains the same one or more values, attributes, and/or relationships as the second object. The underlying representation of the first object in memory need not be the same as the underlying representation of the second object in memory. For purposes of illustrating a clear example, assume that a first program is allocated a first memory segment; a second program is allocated a second segment; the first program maintains a first object in the first memory segment; the second program maintains a second object in the second memory segment; the first object comprises a value: six; the second object comprises a value: six. In this situation, the first object and the second object may be the same object because the first object maintains the same value as the second object, even though the first object and the second object are located in different memory segments.

If the value stored in the first memory segment is stored as an 8-bit integer and the value stored in the second memory segment is stored as an American Standard Code for Information Interchange ("ASCII") string, then the first object and the second object may be the same object because the first object maintains the same value as the second object, even though the underlying representation of the value in the first memory segment is stored differently than the representation of the value in the second memory segment.

As another example, assume that the first program is running on a first computer that comprises a 32-bit processor and addresses memory using 32-bit addresses; the second program is running on a second computer that comprises a 64-bit processor and addresses memory using 64-bit addresses; the first object is a parent object and comprises a pointer to a child object stored in the first memory segment; the second object is a parent object and comprises a pointer to a child object stored in the second memory segment. In this situation, the first object and the second object may be the same object because the first object maintains the same values and relationships as the second object, even though the pointer to the child stored in the first memory segment may be a 32-bit pointer and the pointer in the second memory segment may be a 64-bit pointer.

If the first program stores the data that represents the first object contiguously in the first memory segment and the second program stores the data that represents the second object scattered throughout the second memory segment, then the first object and the second object may be the same object, even though the underlying data structure that represents the first object is stored differently than the underlying data structure that represents the second object.

Or, for example, assume the first program is a first HTTP browser; the second program is a second, different HTTP browser; the first object may have an attribute, "id"; the second object may have an attribute, "id"; the value for the "id" attribute is "MyObject" for both the first object and the second object is. In this situation, the underlying representation of the first object in the first browser may be drastically different than the underlying representation of the second object in the second browser. However, the operations that operate on the two objects may be programmatically identical. For example, the same JavaScript executed by the first HTTP browser and the second HTTP browser may retrieve the first object maintained by the first HTTP browser and the second object, respectively: document.getElementById("MyObject").

Other factors that may result in a different underlying representation of the same object may include the endianness of a processor, amount of memory available, different applications, and/or any other different hardware and/or software configurations.

"Data" may mean any data and/or instructions in electronic digital memory.

An "attribute map" may be a map from one attribute name and/or value to one or more other names and/or values. For example, assume an object has an attribute, "id", which defines a unique identifier: "MyObject". An attribute map may associate "MyObject" with a different unique identifier, such as "tcejbOyM". Additionally, an attribute map may be used to map a modified attribute name and/or value to an original name and/or value. An attribute map may be an operation, hash map, and/or any other method or associative data structure.

A "DOM map" may be a map from a first DOM to a second, different DOM. For example, a DOM map may be a collection of attribute maps. Each attribute map in the DOM map may be an attribute map for an attribute of an object in a first DOM with a modified attribute in a second DOM. Additionally or alternatively, a DOM map may map one hierarchy to another, different hierarchy, and back again. For example, a DOM map may modify a relationship between a first object and a second object, such that a first object is not related to a second object in a first DOM, and the first object is a parent object to the second object in the second DOM.

A "bot" may mean a computer and/or software executed by a computer that automates sending and/or receiving data. For example, a bot may be a web scraper, web crawler, automatic web browser, and/or any other tool designed to submit and/or receive data from one or more web servers. A bot may comprise complex logic designed to respond to data received from one or more web servers.

2.0 GENERAL OVERVIEW

In an embodiment, a data processing method comprises intercepting, from a server computer, a first set of instructions that define a user interface; executing, using a headless browser, the first set of instructions without presenting the user interface; rendering a second set of instructions, which when executed by a client application on a client computer, cause the client computer to present the user interface, wherein the second set of instructions are different than the first set of instructions; sending the second set of instructions to the client computer.

In an embodiment, the method comprises executing, using the headless browser, the first set of instructions to produce one or more data structures in memory; rendering the second set of instructions, which when executed by the client application cause the client computer to generate the one or more data structures in memory on the client computer.

In an embodiment, the method comprises executing, using the headless browser, the first set of instructions to produce one or more data structures in memory; updating the one or more data structures based, at least in part, on a configuration to produce one or more updated data structures; rendering the second set of instructions, which when executed by the client application cause the client computer to generate the one or more updated data structures in memory on the client computer.

In an embodiment, the method comprises receiving, at an intermediary computer, a first request for a first intermediary credential to verify that the intermediary computer is a valid intermediary computer; sending the first intermediary credential to the client application; receiving, at the intermediary computer, a second request for a second intermediary credential, wherein the first request is different than the second request; sending the second intermediary credential to the client application, wherein the first intermediary credential is different than the second intermediary credential.

3.0 SEPARATING FUNCTIONAL UNITS OF A WEB BROWSER

A web browser may be a tool through which application programs can provide client computers with content in a dynamic, custom UI. For example, in response to receiving a request for data from a web browser, a web server responds with a set of instructions. The instructions may define object that include data organized into objects. The instructions may also define how the data and/or objects may be presented in a UI.

Unfortunately, attackers may install malicious instructions on a client computer, by exploiting features of a vulnerable web browser. For example, an attacker may embed malicious instructions in content hosted on a web server, such as a web page, image, or other media. After a vulnerable web browser receives and performs the instructions included in the content from the web server, then the web browser may install and/or execute the malicious instructions on the client computer running the vulnerable web browser. Thus, an attacker may infect a client computer by including instructions in a web page, which when executed by a web browser, causes the web browser to execute the malicious instructions on the client computer.

Separating the frontend of a browser ("browser frontend") from the backend of a browser ("browser backend") may protect a client computer. The browser frontend, as discussed in detail herein, may present a UI to a user using a client computer. The browser backend, as discussed in detail herein, processes content received from a web server. For purposes of illustrating a clear example, assume a browser backend is executed on a server computer, a browser frontend is executed on a client computer, and an attacker has embedded malicious instructions in one or more JavaScript instructions. If the browser backend performs the JavaScript on the server computer, not the client computer, then the client computer need not execute the JavaScript with the embedded malicious instructions.

A headless browser, which may include a browser backend, may apply additional transformations which prevent malicious instructions and/or other data from being installed and/or executed on a client computer. For example, a headless browser may use a browser backend to perform instructions received from a web server. In response, the headless browser may generate one or more data structures that correspond to the objects defined in the received instructions, but need not include the instructions received from the web server. The headless browser may modify the data structures. The headless browser may render and send one or more application instructions to a client application, which when executed by the client application on a client computer recreate the data structures in memory on the client computer. The client application, which may include a browser frontend, may process the application instructions and present a user interface with the browser frontend based, at least in part, on the in-memory data structures.

FIG. 1 illustrates functional units of a web browser in an example embodiment. Browser 100 may be a browser that is executed on a personal computer, used to communicate with or otherwise conceptually visit a web server, and operated by a user using the personal computer. Browser 100 includes browser backend 101 and browser frontend 120. Browser 100 is communicatively coupled with operating system ("OS") system application programming interface ("API") layer 150 and OS frontend API layer 160.

3.1 Browser Backend

Browser backend 101 comprises protocol module 102, domain name server ("DNS") module 104, local storage module 106, image parser 108, CSS parser 110, HTML parser 112, JavaScript parser 114, extension execution environment 116, document object model ("DOM") module 118, and JavaScript execution environment 119. Other embodiments may use other protocols, modules, and/or parsers.

Protocol module 102, DNS module 104, and local storage module 106 may send and/or receive data through OS System API layer 150. For example, protocol module 102 may send and/or receive data over any protocol, such as HTTP, to/from a server computer through OS system API layer 150. Data received through protocol module 102 may reference data sources by one or more domain names. DNS module 104 may resolve the one or more domain names referenced by interfacing with one or more remote domain name servers through OS system API layer 150. Local storage module may store and/or recall data from memory through OS system API layer 150.

Image parser 108, CSS Parser 110, HTML parser 112, and JavaScript parser 114 may parse data received through protocol module 102. HTML parser 112 may parse HTML data. CSS parser 110 may parse CSS data. JavaScript parser 114 may parse JavaScript data. Image parser 108 may parse image data. Each parser may generate and/or update objects in a DOM maintained by DOM module 118.

Browser backend 101 may comprise sets of program logic implementing one or more programmable engines, such as extension execution environment 116 and JavaScript execution environment 119. Extensions may be written one or more programming languages include JavaScript, Python, Ruby, and/or any other language. Each programmable engine may have access to DOM module 118 and may operate on one or more objects from a DOM maintained by DOM module 118. For example, JavaScript execution environment 119 may execute JavaScript parsed by JavaScript parser 114 and in response, create, update, and/or delete one or more objects managed by DOM module 118.

3.2 Browser Frontend

Browser frontend 120 comprises rendering engine 122, interactivity module 124, and user interface 126. Each of the components may cause, through OS frontend API layer 160, one or more objects to be presented to a user using a client computer.

Rendering engine 122 may determine how objects are presented to a user. For example, rendering engine 122 may determine the color, shape, orientation, position, and/or any other visual and/or audio attribute of an image, text field, button, and/or any other object defined by a set of received instructions. Furthermore, rendering engine 122 may cause a button to be displayed on a monitor coupled to a client computer through OS frontend API layer 160.

User interface 126 may determine what may be presented to a user. For example, user interface 126 may determine that a "submit" button should be hidden until data has been entered in one or more text fields. After data has been entered in the one or more text fields, user interface 126 may notify rendering engine 122 to render the "submit" button accordingly.

Interactivity module 124 may receive one or more inputs through OS Frontend API layer 160. For example, in response to a user pressing a button on a mouse coupled to a client computer 299, the OS running on the client computer may send a message to interactivity module 124, through OS frontend API layer 160, to indicate that a user pressed a button on a mouse. Interactivity module 124 may determine that a user selected a particular button currently presented on a monitor. Interactively module 124 may notify user interface 126 and/or rendering engine 122 to update to update the UI accordingly.

4.0 NETWORK TOPOLOGY

Figure 2:
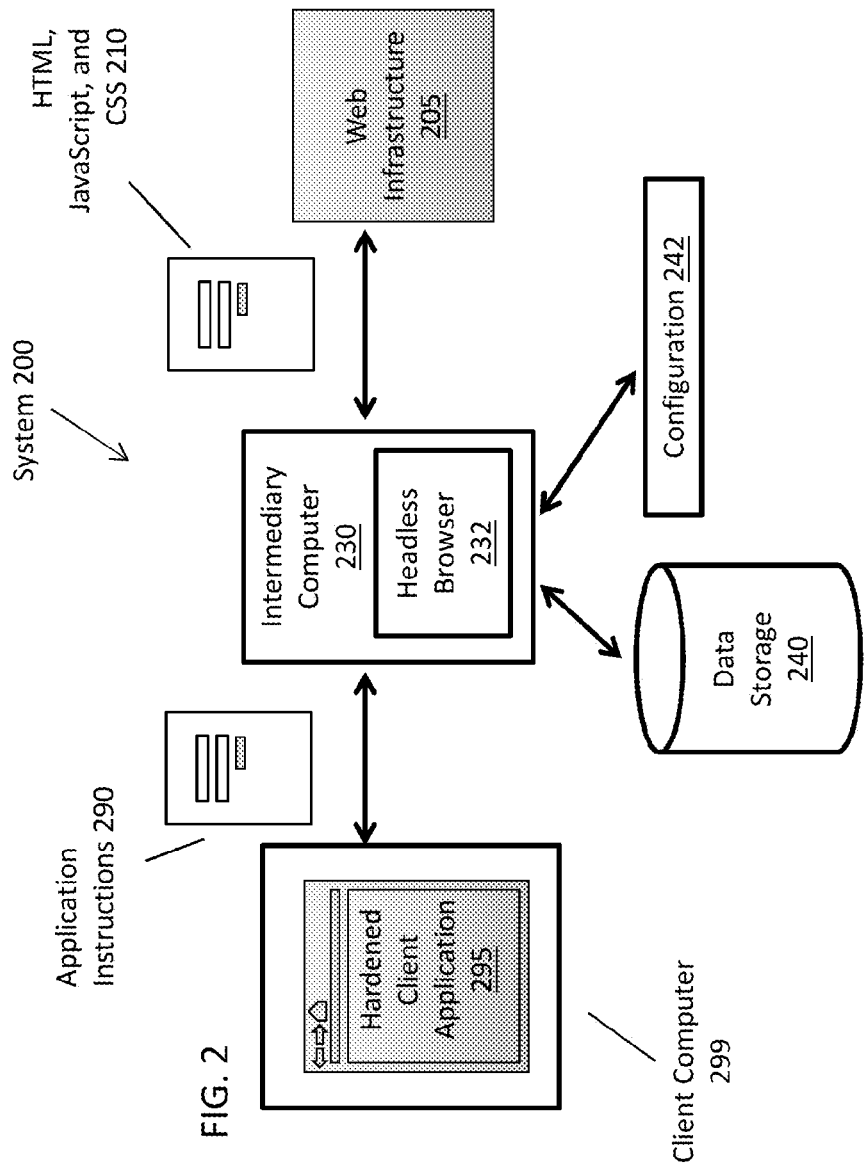
FIG. 2 illustrates a computer system comprising a hardened client application, an intermediary headless browser, and a web infrastructure in an example embodiment.

FIG. 2 illustrates a computer system comprising a hardened client application, an intermediary headless browser, and a web infrastructure in an example embodiment. Referring first to FIG. 2, system 200 includes web infrastructure 205, client computer 299, intermediary computer 230, and data store 240, distributed across a plurality of interconnected networks. Intermediary computer 230 may execute one or more headless browsers. For example, in FIG. 2, intermediary computer 230 comprises and executes headless browser 232.

While each of the components listed above is illustrated as if running on a separate, remote computer from each other, one or more of the components listed above may be part of and/or executed on the same computer. For example, headless browser 232, data store 240, and/or web infrastructure 205 may be executed on the same computer, local area, and/or wide area network. Additionally or alternatively, intermediary computer 230 and/or headless browser 232 may be a proxy server and/or layer for web infrastructure 205. Additionally or alternatively, intermediary computer 230 and/or headless browser 232 may be in line between a router and web infrastructure 205, such that intermediary computer 230 and/or headless browser 232 may intercept all network data sent to, and/or sent from, web infrastructure 205 over one or more protocols. Additionally or alternatively, headless browser 232 may be a software layer between web infrastructure 205, and/or a component of web infrastructure 205, and hardened client application 295.

4.1 Web Infrastructure

Referring again to FIG. 2, web infrastructure 205 may be one or more server computers that receive requests for data from users through one or more browsers, such browser 100 and/or headless browser 232. Web infrastructure 205 may respond by sending data to the browser that sends the request. As illustrated in FIG. 2 the data sent from web infrastructure 205 may include instructions: HTML, JavaScript, and CSS 210.

Figure 3:
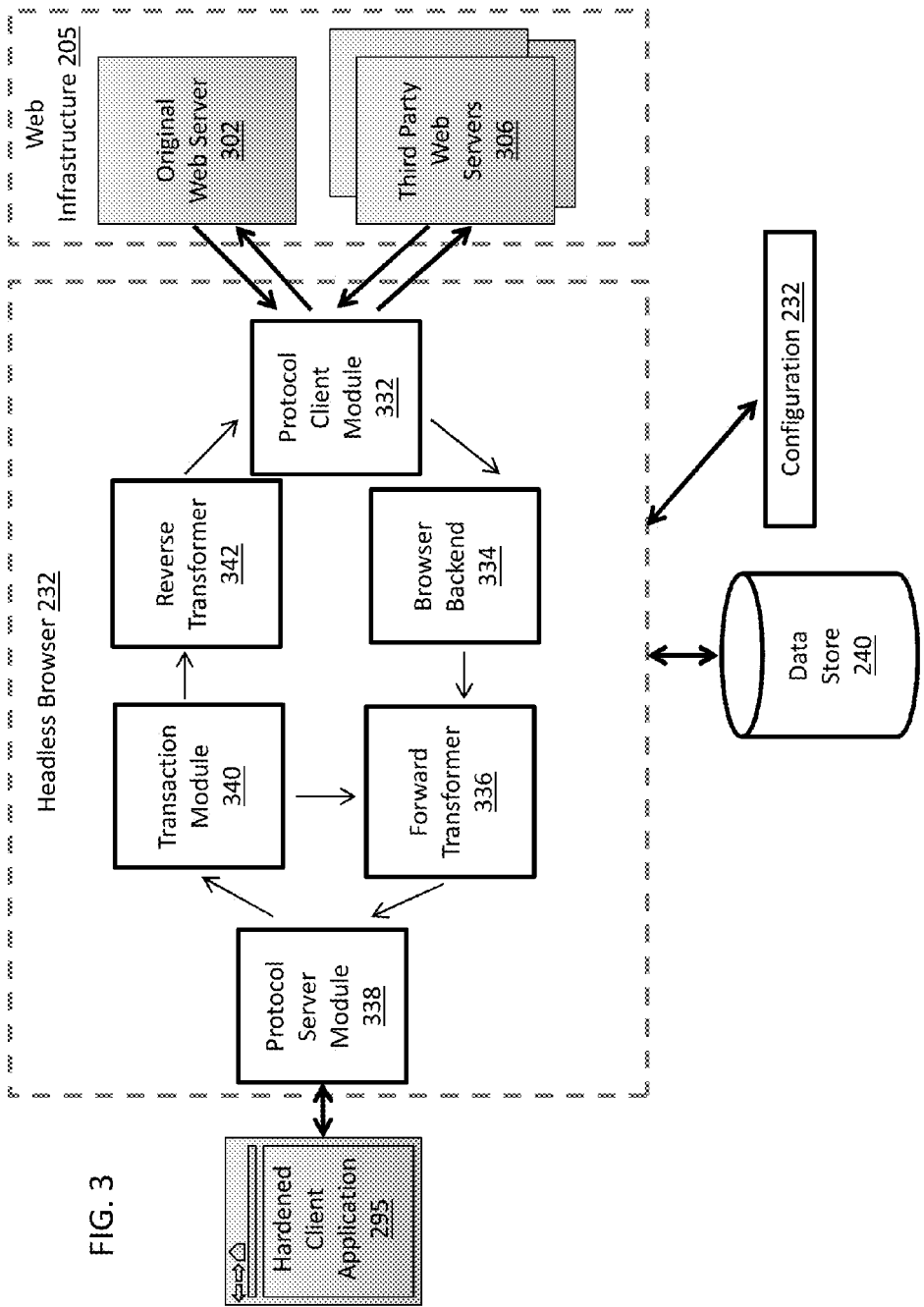
FIG. 3 illustrates a headless browser and a web infrastructure in an example embodiment.

FIG. 3 illustrates a web infrastructure in an example embodiment. The web infrastructure 205 may be described with reference to original web server computer 302 and third party web server computers 306 in FIG. 3, but using the particular arrangement illustrated in FIG. 3 is not required in other embodiments.

Original web server computer 302 may be a server computer that receives requests for data and responds with data. For example, original web server computer 302 may be an HTTP-based web server that receives HTTP requests and responds with data comprising HTML, CSS, and/or JavaScript instructions. Additionally or alternatively, original web server computer 302 may respond with data that references data on other server computers, such as third party web server computers 306.

Third party web server computers 306 may store additional data referenced by instructions sent from original web server computer 302. For example, data from original web server computer 302 may include a reference to a JavaScript file stored on third party web server computers 306. Accordingly, a headless browser and/or a browser backend, such as a browser backend 101 and/or headless browser 232, may request the referenced JavaScript file from third party web server computers 306. Also for example, data from original web server computer 302 may include a reference to an image stored on third party web server computers 306. Accordingly, a headless browser and/or a browser backend, such as browser backend 101 and/or headless browser 232, may request the referenced image from third party web server computers 306.

4.2 Headless Browser

Returning now to FIG. 2, headless browser 232 may be an intermediary that may intercept instructions sent from web infrastructure 205, execute one or more of the intercepted instructions, generate new specialized instructions, and send the specialized instructions to a client application. For example, headless browser 232 may intercept HTML, JavaScript, and CSS 210, generate application instructions 290, and send application instructions 290 to hardened client application 295. Application instructions 290 may comprise proprietary and/or standard instructions. If application instructions 290 include HTML, JavaScript, and/or CSS instructions, then application instructions 290 may include different HTML, JavaScript, and/or CSS instructions than HTML, JavaScript, and CSS 210. Additionally, headless browser 232 may intercept a request from hardened client application 295, generate a new and/or modified request, and send the new and/or modified request to web infrastructure 205.

In FIG. 2, headless browser 232 may be an HTTP or SPDY intermediary that intercepts, executes, and/or processes HTML, JavaScript, and CSS instructions. Additionally or alternatively, headless browser 232 may intercept requests for data and/or instructions from a client application, generate an HTTP request, and send the generated HTTP request to one or more HTTP and/or SPDY-based web servers. However, headless browser 232 may be an intermediary for any other standard and/or proprietary protocol. Furthermore, each of the components discussed, which headless browser 232 is comprised of, may be configured to perform any of the processes and/or methods discussed herein for any standard and/or proprietary protocol.

Intermediary computer 230 may be a server computer that one or more domain name servers or other elements of the domain name system ("DNS") identify in DNS records as a destination network address associated with one or more internet domain names. Accordingly, intermediary computer 230 and/or headless browser 232 may receive requests sent to the one or more domains from hardened client application 195. Based on using DNS to resolve the domain name in a request to a network address, intermediary computer 230 and/or headless browser 232 may forward the request, or a modified request, to a server computer in web infrastructure 205, such as original web server computer 302.

In FIG. 2, headless browser 232 is programmed to receive instructions from, and send requests to, a particular server computer or a particular set of server computers, such as a set of one or more web servers that are owned and/or managed by a single entity, like a particular bank. However, in an embodiment, headless browser 232 may be programmed to receive instructions from, and send requests to, more than one particular server computer and/or particular set of computers.

In FIG. 2, headless browser 232 is programmed to send application instructions to, and receive requests from, a particular type of client application: hardened client application 295. However, in an embodiment, headless browser 232 may be programmed to send application instructions to, receive requests from, and/or open sockets with, one or more types of client applications.

FIG. 3 illustrates, among other things, a more detailed view of headless browser 232, in an example embodiment. The example headless browser 232 may be described with reference to several components illustrated in FIG. 3 and discussed in detail below, but using the particular arrangement illustrated in FIG. 3 is not required in other embodiments. For example, headless browser 232 may comprise protocol client module 332, browser backend 334, forward transformer 336, protocol server module 338, transaction module 340, and reverse transformer 342. In an embodiment, each of the functional units of intermediary computer 230 and/or headless browser 232 may be implemented using any of the techniques further described herein in connection with FIG. 9; for example, the intermediary computer 230 may comprise a general-purpose computer configured with one or more stored programs which when executed cause performing the functions described herein for the intermediary computer, or a special-purpose computer with digital logic that is configured to execute the functions, or digital logic that is used in other computing devices.

4.2.1 Protocol Client

Protocol client module 332 may intercept data over any standard or proprietary protocol. For example, protocol client module 332 may intercept data over HTTP. Accordingly, protocol client module 332 may be communicatively coupled with web infrastructure 205, original web server computer 302, and third party web server computers 306.

4.2.2 Browser Backend

Browser backend 334 may be an HTTP-based headless browser similar to browser backend 101. Additionally or alternatively, browser backend 334 may be based on one or more other standard and/or proprietary protocols.

Browser backend 334 may perform instructions intercepted by protocol client module 332, which cause browser backend 334 to generate one or more objects. After performing the instructions, browser backend 334 may notify forward transformer 336 to begin rendering instructions based on the data structures created by browser backend 334 that are currently in memory. Accordingly, browser backend 334 and forward transformer 336 may be communicatively coupled.

Browser backend 334 may make requests for additional data. For example, if instructions received from Protocol client module 332 reference additional instructions stored on a third party web server, browser backend 334 may request the additional instructions through protocol client module 332. Accordingly, browser backend 334 and protocol client module 332 are communicatively coupled.

4.2.3 Forward Transformer

Forward transformer 336 may render a new set of instructions based on the one or more objects and/or operations in memory. Additionally or alternatively, forward transformer 336 may operate on the objects created by browser backend 334 and generate one or more attribute maps and/or DOM maps. Forward transformer 336 may store the one or more attribute maps and/or DOM maps in data store 240. Accordingly forward transformer 336 may be communicatively coupled to data store 240.

Forward transformer 336 may operate on objects and/or render instructions based on one or more configurations specified in configuration 242. Accordingly, forward transformer 336 may be communicatively coupled to configuration 242.

Forward transformer 336 may send the rendered instructions to protocol server module 338. Accordingly, forward transformer 336 may be communicatively coupled to protocol server module 338.

4.2.4 Protocol Server Module

Protocol server module 338 may receive the instructions generated by forward transformer 336 and send the generated instructions to hardened client application 295. Additionally or alternatively, protocol server module 338 may intercept requests from hardened client application 295 and forward the requests to transaction module 340. Accordingly, protocol server module 338 may be communicatively coupled to hardened client application 295, forward transformer 336, and transaction module 340.

4.2.5 Transaction Store

Transaction module 340 may receive requests intercepted by protocol server module 338 from hardened client application 295. Transaction module 340 may retrieve one or more attribute maps and/or DOM maps, based on data in the request, and forward the request with the retrieved one or more attribute maps and/or DOM maps to reverse transformer 342. Accordingly, transaction module 340 may be communicatively coupled with reverse transformer 342 and data store 240.

4.2.6 Reverse Transformer

Reverse transformer 342 may translate requests intercepted by protocol server module 338, which are based on instructions generated by forward transformer 336, into requests that would have been generated by hardened client application 295 had hardened client application 295 been a web browser and had received the original instructions sent from original web server computer 302. Reverse transformer 342 may translate requests based on the one or more attribute maps and/or DOM maps retrieved by transaction module 340. Reverse transformer 342 may send the translated request to original web server computer 302 through protocol client module 332. Accordingly, reverse transformer 342 may be communicatively coupled with protocol client module 332.

4.2.7 Configurations

Configuration 242 may be a database, a configuration file, and/or any other system that stores configurations: settings, preferences, and/or protocols. Configuration 242 may store more than one configuration for one or more web servers in web infrastructure 205 and/or one or more headless browsers.

4.3 Client Application

Figure 5:
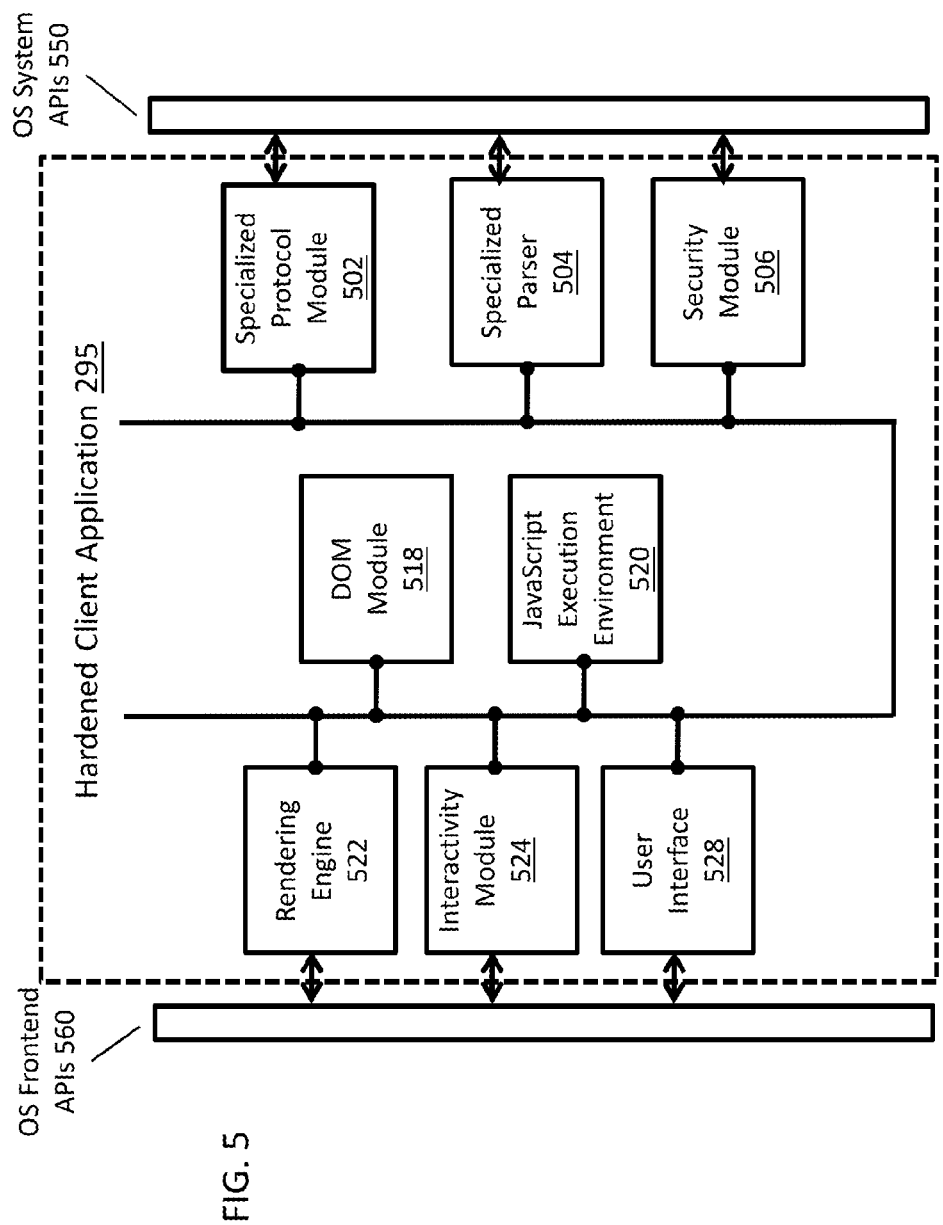
FIG. 5 illustrates functional units of a hardened client application in an example embodiment.

Returning to FIG. 2, in an embodiment, hardened client application 295 may be a client computer program application executed on client computer 299. FIG. 5 illustrates functional units in a hardened client application in an example embodiment. In FIG. 5, hardened client application 295 comprises specialized protocol module 502, specialized parser 504, security module 506, DOM module 518, specialized execution environment 520, rendering engine 522, interactivity module 524, and user interface module 528. Hardened client application 295, and/or one or more of its components, may be communicatively coupled with an intermediary, such as intermediary computer 230 and/or headless browser 232, through OS system APIs 550.

Specialized protocol module 502 may send requests to, and/or receive application instructions from, an intermediary, such as headless browser 232. Specialized protocol module 502 may send and/or receive data over a standard protocol, such as HTTP. Additionally or alternatively, specialized protocol module 502 may receive instructions using a proprietary protocol, such as a proprietary long running socket connection.

Specialized parser 504 may process application instructions received by specialized protocol module 502. The application instructions may be one or more standard and/or proprietary instructions. Application instructions may be a limited set of instructions that cause hardened client application 295 to perform one or more methods that have been tested or otherwise deemed secure and/or non-harmful by the author(s) and/or distributor(s) of hardened client application 295.

Specialized execution environment 520 may have access to DOM module 518 and may operate on one or more objects from a DOM maintained by DOM module 518. For example, specialized execution environment 520 may execute the application instructions parsed by specialized parser 504 and in response, create, update, and/or delete one or more objects managed by DOM module 518.

Rendering engine 522, interactivity module 524, and/or user interface 528 may performed the methods and/or features discussed regarding rendering engine 122, interactivity module 124, and user interface 126, respectively. Rendering engine 522, interactivity module 524, and/or user interface 528 may cause a UI to be presented to a client using client computer 299 through OS fronted APIs 560.

In an embodiment, a client application may be isolated by the underlying OS on the client computer. For example, the data stored on client computer 299 may be encrypted by the hardened client application 295, such that no other application may read the data stored on the device by hardened client application 295. Additionally or alternatively, the operation system may limit the locations on client computer 299 where the hardened client application 295 may store data. In an embodiment, the OS need not allow the hardened client application 295 to store and/or install any data and/or instruction in persistent memory, and/or a file system used by one or more other applications installed on client computer 299.

4.3.1 Security Module

Security module 506 may respond to requests from a headless browser to verify that hardened client application 295 is a secure and valid hardened client application and may perform a security validation of the application. Additionally or alternatively, security module 506 may send a request to a headless browser, such as headless browser 232, to verify that headless browser 232 is a secure and valid headless browser. Security module 506 may be programmed to expect a particular correct response, which may change over time, from a secure and valid headless browser. If the response from the headless browser is incorrect, then security module 506 may cause the hardened client application 295 to disconnect from the headless browser. Additionally or alternatively, if the response from the headless browser is incorrect, then security module 506 may cause hardened client application 295 to disregard and/or not perform application instructions received from the headless browser. Additionally or alternatively, security module 506 may be a watchdog process that limits the functionality and/or operations performed by hardened client application 295 to reinforce security.

Security module 506 may be a watchdog process that monitors other processes and/or applications executed by client computer 299 as the processes are instantiated and executed, ending monitoring when the processes terminate. For example, security module 506 may detect if an "outside process" (a process and/or application other than hardened client application 295) is instantiated or accesses, and/or attempts to access, memory allocated to hardened client application 295 on client computer 299. If so, security module 506 may terminate hardened client application 295 and/or the outside process. Additionally or alternatively, security module 506 may prevent hardened client application 295 from accessing memory outside of the memory allocated to hardened client application 295 on client computer 299.

Security module 506 may encrypt and/or decrypt data stored and/or read by hardened client application 295 in volatile or non-volatile memory on client computer 299. Additionally or alternatively, security module 506 may encrypt and/or decrypt data and/or instructions sent between hardened client application 295 and headless browser 232.

Security module 506 may store data on intermediary computer 230 and/or data store 240. For example, instead of storing a user's credential granting access to a bank account on client computer 299, security module 506 may upload the user's credential to headless browser 232. Headless browser 232 and/or one of its modules may store the user's credential in data store 240. Additionally or alternatively, security module 506 may upload the user's credential to data store 240, without using headless browser 232.

Security module 506 may prevent hardened client application 295 from installing and/or storing executable content on client computer 299. For example, executable code may be embedded in an image file, which when installed and/or used, causes a key logger to be executed by client computer 299. The key logger may log a user's input, such as key strokes, and report what a user typed to a fraudster. In this example, security module 506 may prevent hardened client application 295 from storing, opening, and/or using an image file and/or any other content that may be, or may potentially be, malicious and/or insecure. Additionally or alternatively, security module 506 may also simulate keyboard signal to inject false data in a running key logger.

Security module 506 may implement one or more polymorphic methods and/or protocols that prevent a bot, automated script, and/or process from reading data caused to be presented by rendering engine 522, interactivity module 524, and/or user interface 528. Security module 506 may implement one or more polymorphic methods and/or protocols that prevent an automated script and/or process from inputting data into rendering engine 522, interactivity module 524, and/or user interface 528.

Security module 506 may perform one or more integrity checks to ensure that all the data intended to be sent and/or received between hardened client application 295 and headless browser 232 is actually received by the intended recipient. For example, security module 506 may perform a checksum on a set of application instructions sent by headless browser 232. Security module 506 may compare the checksum with a checksum embedded in the received application instructions by headless browser 232. Additionally or alternatively, security module 506 may embed a checksum in data and/or instructions set to headless browser 232. Headless browser 232 may compute a checksum and compare the computed checksum with the checksum embedded in the received data and/or instructions. If data and/or instructions are received by headless browser 232 and/or hardened client application 295 that include checksum that does not match a computed checksum, then headless browser 232 and/or hardened client application 295 may ignore the data and/or instructions.

5.0 PROCESS OVERVIEW

In an embodiment, a data processing method may be configured to intercept instructions from a server computer that are directed toward a client computer, execute the intercepted instructions within the server computer without providing the original instructions to the client computer, generate different instructions, and/or send the different instructions to a client application to present a UI based on the intercepted instructions. In an embodiment, a data processing method may be configured to receive requests from a client application, cache data from the request, modify the request, send the modified request to a web server, receive data from the web server in response to the modified request, and/or send a response to the client application. Various embodiments may use standard web protocols, such as HTTP, and/or standard web-based instructions, such as HTML, CSS, and/or JavaScript. Additionally or alternatively, other standard and/or proprietary protocols may be used. Additionally or alternatively, other standard and/or proprietary instructions may be used.

5.1 Intercepting Instructions from a Content Server Computer

Figure 6:
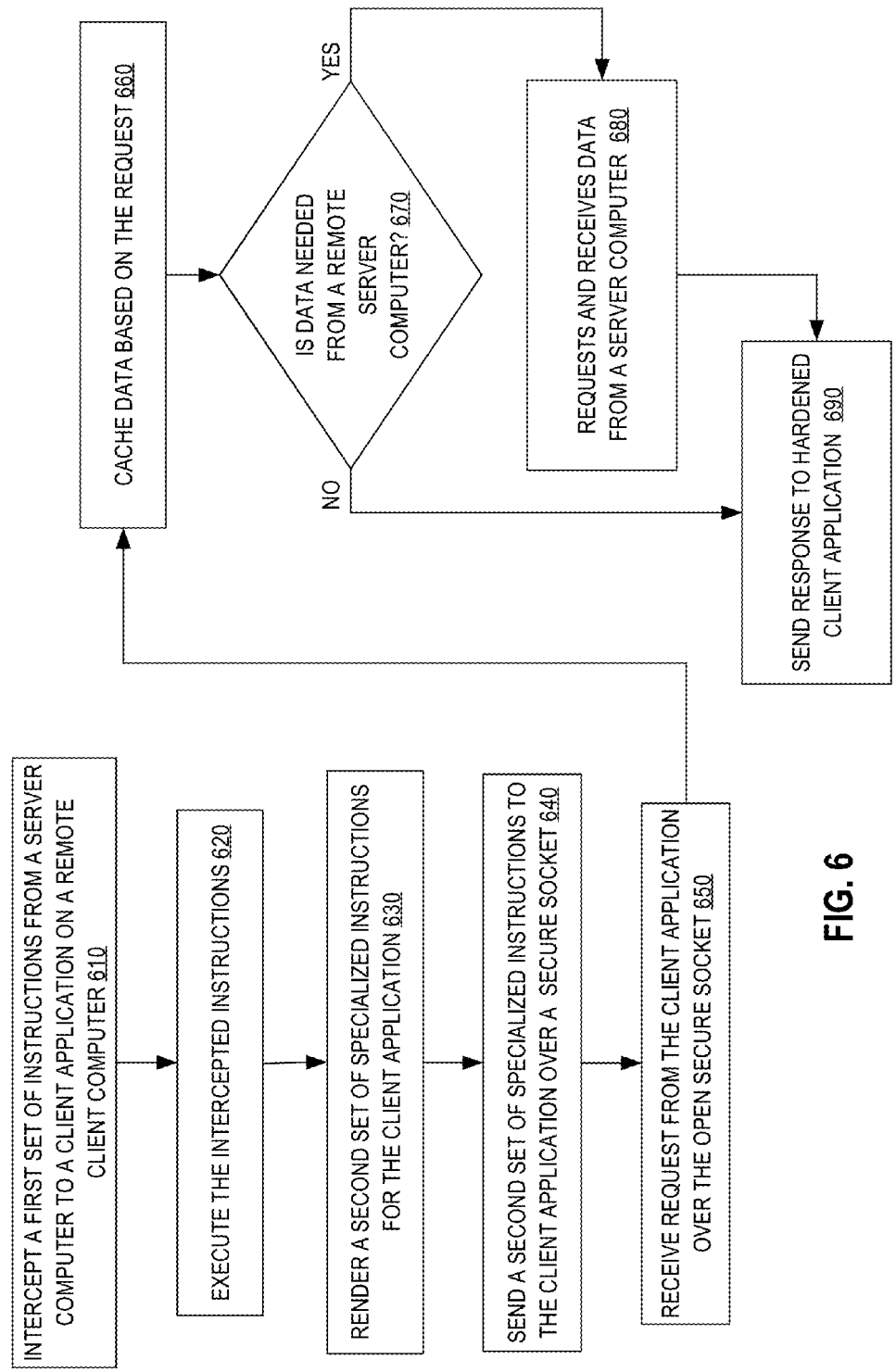
FIG. 6 illustrates a process for intercepting instructions from a server computer, rendering new instructions, sending the new instructions to a client application, receiving a request from the client computer, and responding, in an example embodiment.

FIG. 6 illustrates a process for intercepting instructions from a server computer, rendering new instructions, sending the new instructions to a client application, receiving a request from the client computer, and responding, in an example embodiment. In step 610, a headless browser intercepts a first set of instructions from a server computer to a client application on a remote client computer. For example, protocol client module 332 may receive instructions from original web server computer 302. The instructions may comprise HTML, CSS, and/or JavaScript.

In step 620, the headless browser executes the intercepted instructions. For example, protocol client module 332 may send the HTML, CSS, and/or JavaScript to browser backend 334. Browser backend 334 may execute the instructions.

Figure 4:
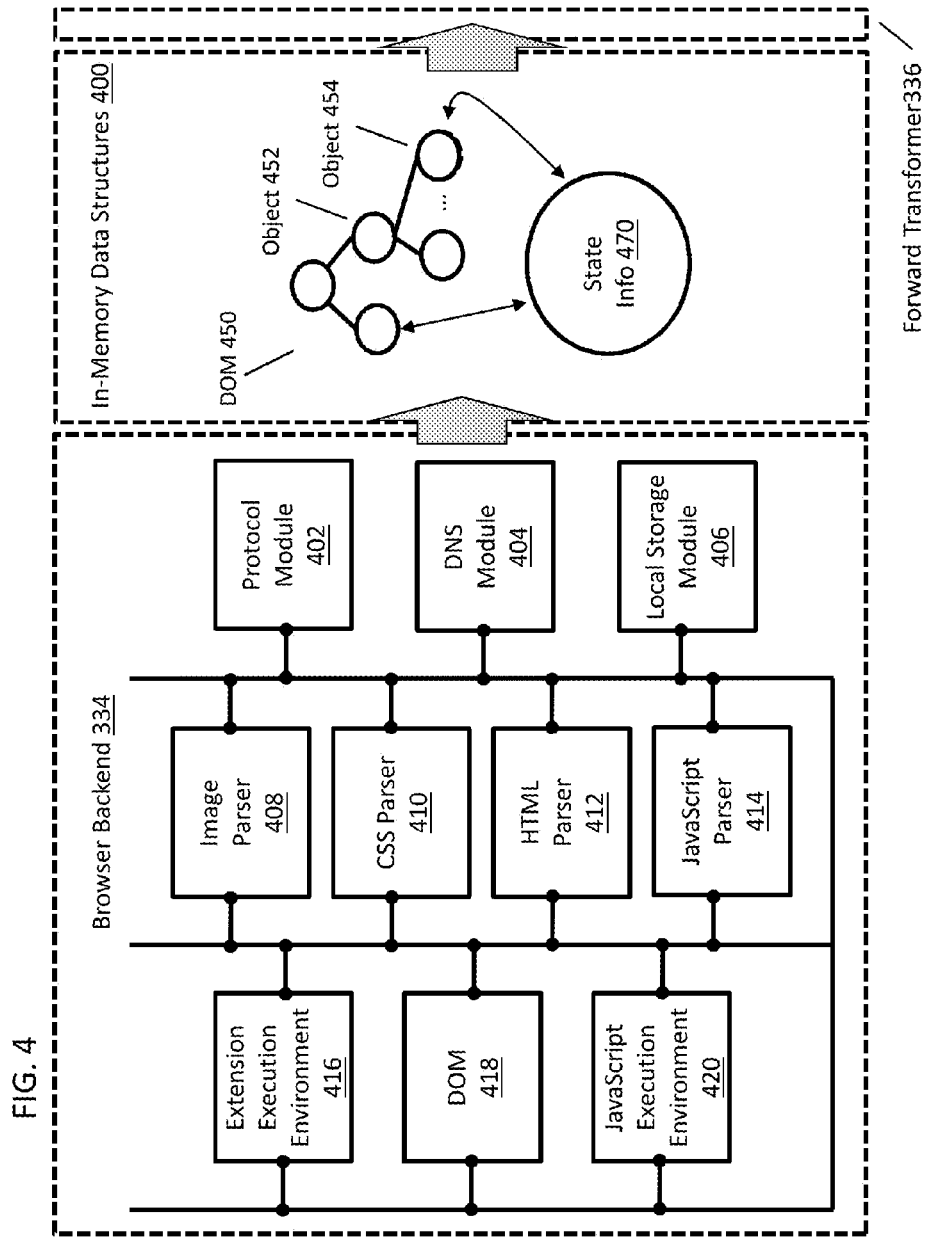
FIG. 4 illustrates functional units of a headless browser and in-memory data structures in an example embodiment.
Figure 7:
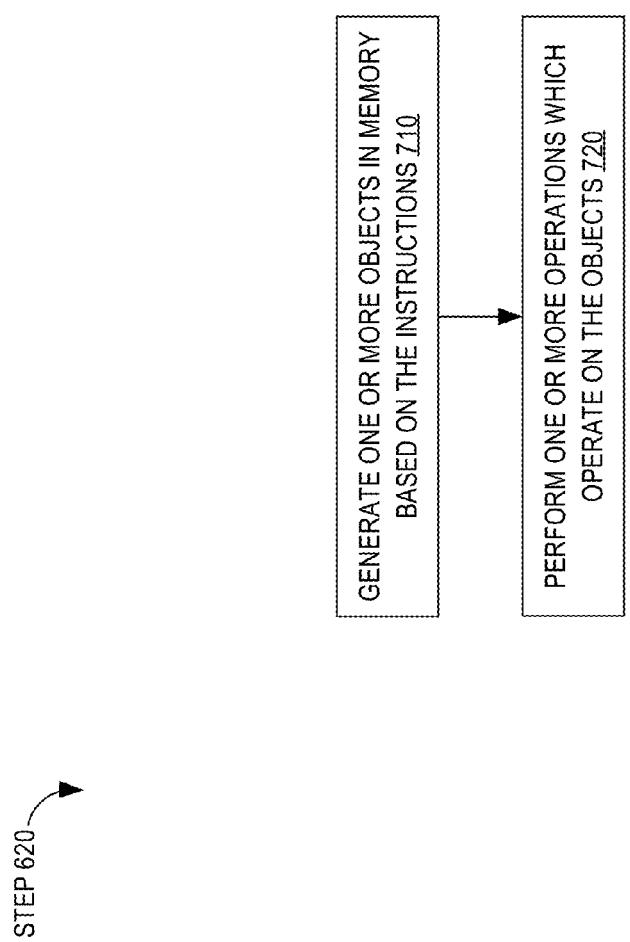
FIG. 7 illustrates a process for executing the intercepted instructions in an example embodiment.

FIG. 7 illustrates a process for executing the intercepted instructions in an example embodiment. In step 710, a headless browser generates one or more objects in computer memory based on the intercepted instructions. For example, browser backend 334 may generate a DOM containing objects defined in the instructions in memory on intermediary computer 230. FIG. 4 illustrates objects and operations stored in memory by browser backend 334, in an example embodiment. HTML parser 412 may parse the HTML received by browser backend 334. Based on the parsed HTML, DOM module 418 may create DOM 450 and objects in DOM 450: object 452 and object 454. Furthermore, based on the parsed HTML, DOM module 418 may define object 452 to be the parent object of object 454 in DOM 450. Additionally, one or more objects in DOM 450 may comprise one or more attributes based on the parsed HTML. Furthermore, image parser 408, CSS parser 410, and/or JavaScript parser 414 may generate state info 470, which is a collection of data and/or operations that reference and/or are associated with objects in DOM 450.

Returning now to FIG. 7, in step 720, the headless browser performs one or more operations which operate on the objects. For example, JavaScript execution environment 419 may execute one or more operations in state info 470, which operate on the one or more objects in DOM 450. Additionally or alternatively, JavaScript execution environment 419 may execute one or more JavaScript instructions in received HTML, JavaScript, and CSS 210. Additionally or alternatively, extension execution environment 416 or JavaScript execution environment 420 may perform one or more other operations that update DOM 450 and/or one or more objects in DOM 450.

5.2 Rendering New, Different Instructions

Returning now to FIG. 6, in step 630, the headless browser renders a second set of specialized instructions for the client application. As discussed earlier, the originally received instructions may, but need not be, HTML, CSS, and/or JavaScript instructions. Furthermore, the rendered instructions may, but need not be, HTML, CSS, and/or JavaScript instructions. For purposes of illustrating a clear example, assume that the originally intercepted instructions in step 610 comprise HTML, CSS, and JavaScript instructions: HTML, JavaScript, and CSS 210. Furthermore, assume that forward transformer 336 is configured to generate proprietary application instructions that hardened client application 295 is programmed to parse and perform, such as application instructions 290.

In an embodiment, application instructions 290 may be limited to methods and/or functions that have been deemed to be safe by hardened client application 295. For example, hardened client application 295 may support one or more instructions to display a button at a particular location on a display. However, hardened client application 295 need not support one or more instructions that install and/or persistently store a image, pdf, flash file, data, and/or executable code on a client computer.

In an embodiment, application instructions 290 do not include the headers in the originally intercepted instructions. For example, forward transformer 336 may render application instructions 290 without the HTTP headers included in HTML, JavaScript, and CSS 210. Additionally or alternatively, the headers in application instructions 290 may be different than the headers in the intercepted instructions: HTML, JavaScript, and CSS 210.

In an embodiment, the UI may be partially predetermined by hardened client application 295. The rendered application instructions may comprise data objects encoded in one or more standard and/or proprietary data formats that populate a UI. For example, application instructions 290 may include a string for a button label. Also for example, application instructions 290 may include data that indicates the dimensions and/or placement of the button. Application instructions 290 need not contain executable instructions.

The rendered application instructions need not comprise the same programming language(s), scripting language(s), and/or data interchange format(s) as the original instructions intercepted in step 610. For example, the rendered instructions may comprise one or more other standard languages, formats, and/or codes that are not included in the originally intercepted instructions: Dynamic HTML, XML, eXtensible Stylesheet Language, VBScript, Lua, YAML Ain't Markup Language ("YAML"), JavaScript Object Notation ("JSON"), shell script, Java, Ruby, Python, and/or Lisp. Also for example, rendered application instructions may comprise one or more proprietary, bit-packed, and/or binary encoded instructions and/or data formats.

Figure 8:
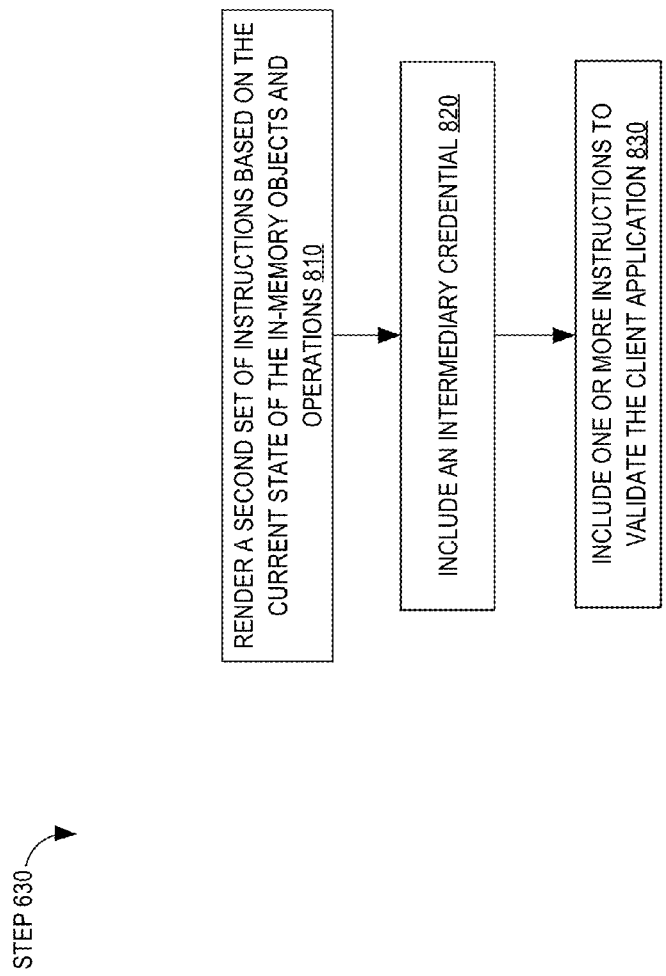
FIG. 8 illustrates a process for rendering instructions and implementing one or more watchdog features in an example embodiment.

FIG. 8 illustrates a process for rendering new, different instructions and implementing one or more watchdog features in an example embodiment. In step 810, the headless browser renders a second set of instructions based on the current state of the in-memory objects and operations. For example, forward transformer 336 may render application instructions 290, which when executed, generate the same objects and/or operations as currently existing in in-memory data structures 400.

In an embodiment, before forward transformer 336 renders application instructions 290, forward transformer 336 may modify one or more in-memory objects and/or operations based on one or more polymorphic protocols. Additionally or alternatively, after forward transformer 336 renders application instructions 290, forward transformer 336 may modify the rendered application instructions 290. Accordingly, the content, and/or format of the content, from the headless browser to a client application may vary over time. For example, according to a polymorphic protocol, forward transformer 336 may modify one or more of the identifiers of the objects and/or operations. Also for example, one or more supervisor operations may be added which intercept calls to originally defined objects and/or operations. The one or more supervisor operations may allow the caller method to operate on the reference object and/or operation based on one or more factors, such as which method and/or operation called an originally defined object and/or operation, or whether access to the called object and/or operation is allowed.

Forward transformer 336 may use configuration 242 to determine which polymorphic method(s) and/or protocol(s) to use. Accordingly, configuration 242 may define one or more polymorphic protocols. Additionally or alternatively, configuration 242 may define which objects, operations, and/or instructions may be modified. Additionally or alternatively, configuration 242 may define which objects, operations, and/or instructions need not be modified.

Headless browser 232 may select a configuration in configuration 242 based on any number of factors. For example, headless browser 232 may select a configuration in configuration 242 based on a domain associated with the server computer that the instructions were intercepted from. Additionally or alternatively, headless browser 232 may select a configuration in configuration 242 based on a random variable seeded by time. Additionally or alternatively, headless browser 232 may select a configuration in configuration 242 based on attributes and/or properties of hardened client application 295. For example, headless browser 232 may select a configuration based on what types of instructions hardened client application 295 is capable of interpreting and/or processing.

5.2.1 Validating a Headless Browser

In step 820, the headless browser may include an intermediary credential to validate the headless browser. An intermediary credential may include a particular code and/or other data to validate the authenticity of the headless browser. For example, forward transformer 336 may include an intermediary credential in application instructions 290. After hardened client application 295 receives the intermediary credential, security module 506 may verify that the intermediary credential is valid. In response, hardened client application 295 may execute client application instructions 290; otherwise, hardened client application 295 may discard the received application instructions.

The intermediary credential may be dynamic. For example, a dynamic credential may be based on time and/or any other factor(s). A client application may be programmed to expect and/or validate the correct intermediary credential from headless browser 232. If the intermediary credential is dynamic, then a fraudster may have a harder time spoofing the intermediary credential, and thus a harder time spoofing a headless browser.

A headless browser may send an intermediary credential to a client application in other cases. For example, a headless browser may send an intermediary credential to a client application when the client application and the headless browser are opening a long-running socket. Also for example, in response to a request from a first client application, a headless browser may respond with an intermediary credential.

5.2.2 Validating a Client Application

In step 830, the headless browser may include one or more instructions to validate the client application. For example, forward transformer 336 may include one or more instructions, which when processed by a client application, may cause security module 506 to return a client application credential to validate that hardened client application 295 is a valid, uncompromised client application. The one or more instructions may be based on an account, username, password, internet protocol address, clock, and/or any other factor(s) or input. If hardened client application 295 fails to provide a valid client application credential, then headless browser 232 may terminate the connection and/or ignore requests from hardened client application 295.

The client application credential may be dynamic and/or change periodically. For example, the one or more instructions to validate the client application may be based on a clock time, causing a client application credential to change over time. Additionally or alternatively, security module 506 may be programmed to give one of a preset number of client application credentials. Headless browser 232 may be programmed to expect the correct client application credential from hardened client application 295. The client application credential may be encrypted using one or more encryptions schemes. If the client application credential is dynamic, then a fraudster may have harder time spoofing a client application credential, and thus a comprising and/or spoofing a client application.

Headless browser 232 may request to validate the client application from time to time, without sending a corresponding set of application instructions. For example, forward transformer 336 may send a request to validate hardened client application 295 when hardened client application 295 and the headless browser 232 are opening a long-running socket.

After headless browser 232 receives a client application credential, headless browser 232 or a module, such as protocol server module 338, transaction module 340, and/or reverse transformer 342, may verify that the received client application credential is valid. If the client application credential is valid, then headless browser 232 may continue to interact with hardened client application 295. If not, then headless browser 232 may close any connection to hardened client application 295 until hardened client application 295 provides a valid application credential.

5.3 Sending and Performing Application Instructions

Returning to FIG. 6, in step 640, the headless browser may send the second set of specialized instructions to the client application over a secure socket. For example, headless browser 232 may open a long-running encrypted socket between headless browser 232 and hardened client application 295. In an embodiment, hardened client application 295 may open the secure socket with headless browser 232 before headless browser 232 intercepts the first set of instructions from a server computer to the client computer in step 610. Headless browser 232 may send the rendered instructions from step 630 to hardened client application 295.

A client application may perform the one or more received application instructions and present a UI accordingly. For example, hardened client application 295 may perform application instructions 290, which cause hardened client application 295 to generate the same in-memory data structures that headless browser 232 generated and/or modified in step 620 and/or step 630. Hardened client application 295 may generate and/or populate a UI based on application instructions 290 and/or the generated in-memory data structures. Security module 506 may validate headless browser 232 based on the intermediary credential included in the received instructions. Security module 506 may also perform the one or more instructions to generate a client application credential. Security module 506 may send the client application credential to headless browser 232.

In an embodiment, a headless browser may send application instructions over time based on validation of the headless browser by the client application and validation of the client application by the headless browser. For example, headless browser 232 may send hardened client application 295 a portion of the application instructions. The portion of application instructions may include an intermediary credential and application instructions, which when processed by hardened client application 295, may cause hardened client application 295 to produce a client application credential and send the client application credential to headless browser 232. After hardened client application 295 receives the portion of application instructions and validates headless browser 232, then hardened client application may produce the client application credential and send the client application credential to headless browser 232. After headless browser 232 receives and validates the client application credential, then headless browser 232 may send the remainder of the application instructions generated in step 620 and/or step 630 to hardened client application 295.

5.4 Requesting Additional Instructions

In step 650, the headless browser may receive a request from the client application over the open secure socket. For example, hardened client application 295 may receive input indicating that a user selected a particular button that is a link to additional content that hardened client application 295 does not have. In response, hardened client application 295 may submit a request to headless browser 232 for the additional content.

In step 660, the headless browser caches data based on the request. For example, protocol server module 338 may receive the request and pass the request to transaction module 340. The request may include user credentials to login and control a bank account. Transaction module 340 may store the credentials in data store 240. Additionally or alternatively, protocol server module 338 may store the credentials in data store 240.

In step 670, the headless browser determines whether data is needed from a remote server computer. For example, if the request received in step 650 is for data stored in data store 240, then control may proceed to step 690; otherwise control may proceed to step 680.

In step 680, the headless browser requests and receives data from a server computer. For example, transaction module 340 may forward the request received in step 650 to reverse transformer 342. Reverse transformer 342 may generate a new request based on the request received in step 650. For example, reverse transformer 342 may generate a new request by modifying the received request based on the changes made by forward transformer 336, including any attribute maps and/or DOM maps stored in data store 240. After the new request is generated by reverse transformer 342, reverse transformer 342 sends the request through protocol client module 332. The new request may be sent to original web server computer 302 and/or any other server that stores the requested data and/or instructions. Protocol client module 332 may receive the requested data from original web server computer 302.

In step 690, the headless browser sends a response to hardened client application. For example, if transaction module 340 determines that the data requested by hardened client application 295 is stored in data store 240 in step 670, then transaction module 340 may collect the requested data from the data store 240 and send the data to forward transformer 336. Forward transformer 336 may render application instructions based on the collected data and send the application instructions through protocol server module 338 to hardened client application 295. Additionally or alternatively, if additional data and/or instructions were received from a server computer in step 680, then browser backend 334 and/or forward transformer 336 may render application instructions based on the received data and/or instructions. Forward transformer 336 may send the application instructions to hardened client application 295 through protocol server module 338.

6.0 AN EXAMPLE PROCESS TO MANAGE A BANK ACCOUNT THROUGH A HARDENED CLIENT APPLICATION AND A HEADLESS BROWSER

The computer systems, logic and processes described herein may be applied in many tangible, concrete contexts with the result and benefit of improving machine efficiency by preventing the unnecessary execution of non-secure and/or unexpected machine operations. As an example, the techniques herein may be used to manage a bank account through a hardened client application and a headless browser according to an embodiment. For purposes of illustrating a clear example, this example process may be described with reference to one or more figures, but using the particular arrangement illustrated in the one or more other figures is not required in other embodiments. While this process describes managing a bank account for purposes of illustrating a clear example, other embodiments may omit, add to, reorder, and/or modify any of the elements discussed.

An account holder at a particular bank, using a web browser, such as browser 100, running on client computer 299, may request account data from the particular bank. In response, the particular bank may send HTML, CSS, and/or JavaScript instructions, which when executed by the browser may present the account holder with a link to open, download, and/or install a hardened client application. An option to continue using the browser may also be presented. The account holder may select the link, and the browser may download and/or install the hardened client application 295. Additionally or alternatively, the account holder may download hardened client application 295 through another service, such as an application repository that stores applications compatible with client computer 299. For example, hardened client application 295 may be a mobile application that a mobile device may download and/or install from a mobile application store. The account holder may cause client computer 299 to begin executing hardened client application 295.

Hardened client application 295 may open a long-running secure socket with headless browser 232. Hardened client application 295 and headless browser 232 may exchange credentials, such that hardened client application 295 may validate headless browser 232 and headless browser 232 may validate hardened client application 295. If the long-running secure socket is closed, then hardened client application 295 and/or headless browser 232 may open a new long-running secure socket between each other. Hardened client application 295 and headless browser 232 may validate each other again. Additionally or alternatively, hardened client application 295 and headless browser 232 may validate each other periodically to make sure neither one has been corrupted and/or compromised. Additionally or alternatively, the client application credential may be a particular hard coded credential provided by the bank, such that only a hardened client application provided by the bank may use headless browser 232 to access a bank account held at the bank. Furthermore, headless browser 232 may submit the particular hard coded credential to the bank to indicate that it is handling a request on the behalf of a hardened client application provided by the bank.

The account holder may enter bank account credentials, such as a user name and password, into fields that hardened client application 295 may cause to be displayed. Hardened client application 295 may send headless browser 232 the bank account credentials.

Headless browser 232 may generate a request to send to the bank's web server(s): web infrastructure 205. Headless browser 232 may store the account credentials in data store 240.

In response to sending the account credentials to the banks' web server(s), headless browser 232 may receive, from web infrastructure 205, HTML, CSS, and/or JavaScript instructions. The instructions may include a security token that identifies the account holder, data that describes the state of the account, and/or instructions that define a UI to present at least a portion of the data. Headless browser 232 may store the security token in data store 240.

Headless browser 232 may execute the instructions, and render application instructions that hardened client application 295 is programmed to perform. Headless browser 232 may send the application instructions to hardened client application 295. Headless browser 232 may include an intermediary credential that hardened client application 295 may use to validate headless browser 232. Headless browser 232 may include one or more instructions to validate hardened client application 295.

Hardened client application 295 may receive the application instructions. In response, hardened client application 295 may execute the application instructions and present a UI accordingly. The UI may present the account holder with data describing the state of the bank account. Additionally or alternatively, hardened client application 295 may validate headless browser 232 using the included intermediary credential. Hardened client application 295 may perform the one or more instructions to validate hardened client application 295. Hardened client application 295 may produce a client application credential accordingly. Hardened client application 295 may send the client application credential to headless browser 232. Headless browser 232 may validate hardened client application 295 accordingly.

Hardened client application 295 may receive data from client computer 299 indicating that the account holder selected a button in the UI requesting a list of recent transactions. In response, hardened client application 295 may send a request to headless browser 232 for the list of recent transactions through the long-running socket. Hardened client application 295 need not include the security token received from web infrastructure 205, because in this example, headless browser 232 stored the security token in data store 240.

Headless browser 232 may receive the request for the list of recent transactions. If headless browser 232 already had the list of recent transactions stored in data store 240, then headless browser 232 may generate and respond with application instructions that include the list of recent transactions from data store 240. However, for this example, assume that data store 240 does not include the list of recent transactions for the account holder's account. Thus, headless browser 232 may send a request for the list of recent transactions to web infrastructure 205. Headless browser 232 may identify the particular account by including the security token received from web infrastructure 205, which was stored in data store 240.

Headless browser 232 may receive HTML, CSS, and/or JavaScript instructions describing the list of recent transactions. Headless browser 232 may execute the instructions and produce a new set of application instructions. Headless browser 232 may send the new application instructions to hardened client application 295.

Hardened client application 295 may present the list of recent transactions to the account holder through client computer 299. The list of recent transactions may be presented in a UI according to the received, new application instructions.

In the above example, an account holder uses a hardened client application to securely control a corresponding bank account with a credential that identified the account holder. Additionally or alternatively, one or more users may use a hardened client application to browse one or more web servers anonymously and/or securely through the same headless browser. In all cases, a benefit of these techniques is that machine efficiency is improved because the computers involved in a transaction or process are not required to execute unnecessary instructions or operations that would otherwise occur as a result of the influence of malware or fraudsters. In some cases, transactions or processes may execute more rapidly because such unnecessary operations are avoided.

7.0 MITIGATING RISK OF INFECTING A GROUP'S INTERNAL SERVER COMPUTER

Groups, such as companies, that allow members, such as employees, to use their own personal client computers on a company network, may risk internal server computers being infected with malicious programs installed on personal client computers. A group may reduce the risk by requiring members using personal devices to access an internal server computer through a hardened client application and a headless browser running on a local intermediary computer.

The internal server computer may be configured to accept connections between headless browsers running on local intermediary computers, but need not accept other connections. For example, if an employee wants access to a company's local server computer, then the employee may install a hardened client application. The employee may interface with the company's local server computer through the installed hardened client application and a headless browser executed on a local intermediary.

The hardened client application may be distributed by the group internally. The hardened client application may be a proprietary client application developed by and/or for the group and its members. The hardened client application and/or the internal intermediary computer may be configured to perform operations that the group has deemed to be safe. The headless browser may be a proprietary headless browser developed by and/or for the group and its members. The headless browser may be configured to send data, requests, and/or instructions to the group's internal server computer that the group has deemed to be safe. Thus, an exclusive group, such as a company, may mitigate risk by using, internally, the techniques discussed herein.

8.0 IMPLEMENTATION MECHANISMS

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
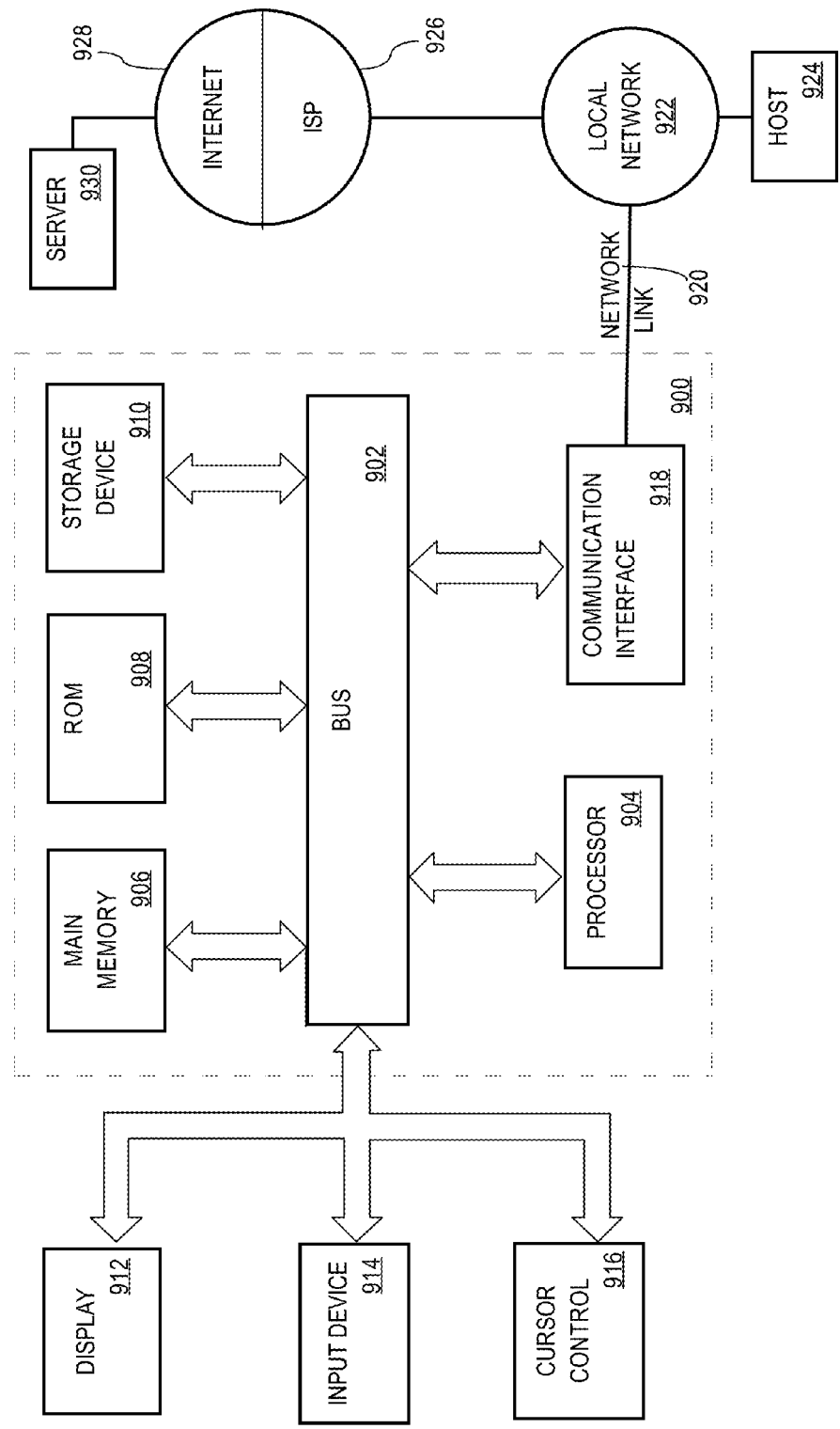
FIG. 9 illustrates a computer system upon which an embodiment may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

9.0 OTHER ASPECTS OF DISCLOSURE

Using the networked computer arrangements, intermediary computer, and/or processing methods described herein, security in client-server data processing may be significantly increased. In particular, the use of browser programs becomes significantly more secure. Forward transforming and reverse transforming techniques herein effectively permit obfuscating data field and/or container identifiers and DOM modification for data that is financial, personal, or otherwise sensitive so that attackers cannot determine which fields and/or containers in a web page include the sensitive data. Consequently, one or more various attacks, such as a denial of service ("DOS") attack, credential stuffing, fake account creation, ratings or results manipulation, man in the browser attacks, reserving rival goods or services, scanning for vulnerabilities, and/or exploitation of vulnerabilities, are frustrated because all fields and/or containers appear to the attacker to be gibberish, or at least cannot be identified as indicating credit card data, bank account numbers, personally identifying information, confidential data, sensitive data, proprietary data, and/or other data.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   intercepting, from a server computer, a first set of instructions that define a user interface;
   wherein the first set of instructions include one or more headers;
   stripping out the one or more headers;
   executing, using a headless browser, the first set of instructions without presenting the user interface to produce one or more data structures in memory;
   updating the one or more data structures based, at least in part, on a configuration to produce one or more updated data structures;
   wherein the updating comprises modifying one or more objects or operations in one or more document object model (DOM) maps in memory according to a polymorphic protocol;
   rendering a second set of instructions, which when executed by a client application on a client computer, cause the client computer to present the user interface, and to generate the one or more updated data structures in memory on the client computer, wherein the second set of instructions are different than the first set of instructions;
   wherein the second set of instructions do not include the one or more headers;
   sending the second set of instructions to the client computer;
   wherein the method is performed by one or more computing devices.

2. The method of claim 1 further comprising:
   executing, using the headless browser, the first set of instructions to produce one or more data structures in memory;
   rendering the second set of instructions, which when executed by the client application cause the client computer to generate the one or more data structures in memory on the client computer.

3. The method of claim 1 further comprising:
rendering the second set of instructions, which when executed by the client application causes the client application to validate the client application and send a dynamic client credential;
receiving the dynamic client credential from the client application;
verifying the dynamic client credential is correct.

4. The method of claim 1 further comprising:
receiving, at an intermediary computer, a first request for a first intermediary credential to verify that the intermediary computer is a valid intermediary computer;
sending the first intermediary credential to the client application;
receiving, at the intermediary computer, a second request for a second intermediary credential, wherein the first request is different than the second request;
sending the second intermediary credential to the client application, wherein the first intermediary credential is different than the second intermediary credential.

5. The method of claim 1 further comprising:
rendering the second set of instructions, which when executed by the client application causes the client application to auto-generate data interspersed into keyboard data.

6. The method of claim 1 further comprising:
receiving, from a second web server, a set of supplementary instructions, which the first set of instructions reference and which define a portion of the user interface;
executing, by the headless browser, the set of supplementary instructions without presenting the portion of the user interface;
rendering the second set of instructions, which when executed by the client application on the client computer, cause the client computer to present the portion of the user interface to a user, wherein the second set of instructions are different than the set of supplementary instructions.

7. The method of claim 1 further comprising:
intercepting, from the client application, a set of user data;
caching the set of user data;
receiving, from the client application, a request to be sent to the server computer;
generating a modified request based on the request and the set of user data;
sending the modified request to the server computer.

8. The method of claim 1 further comprising:
sending the second set of instructions to the client application through a persistent secure socket connection;
receiving, from the client application, a request, which is not based on a URL, to perform a process and return a result, though the persistent secure socket connection;
performing the process;
sending the result to the client application, through the persistent secure socket connection.

9. The method of claim 1, wherein executing the first set of instructions using the headless browser to produce one or more data structures in memory comprises generating one or more document object model (DOM) maps in memory in response to executing the first set of instructions.

10. A computer comprising:
a processor;
a memory;
a browser backend module configured to:
intercept, from a server computer, a first set of instructions that define a user interface;
wherein the first set of instructions include one or more headers;
strip out the one or more headers;
execute the first set of instructions without presenting the user interface to produce one or more data structures in memory;
a forward transformer module configured to:
update the one or more data structures based, at least in part, on a configuration to produce one or more updated data structures;
wherein to update comprises to modify one or more objects or operations in one or more document object model (DOM) maps in memory according to a polymorphic protocol;
render a second set of instructions, which when executed by a client application on a client computer, cause the client computer to present the user interface, and to generate the one or more updated data structures in memory on the client computer, wherein the second set of instructions are different than the first set of instructions;
wherein the second set of instructions do not include the one or more headers;
send the second set of instructions to the client computer.

11. The computer of claim 10, wherein:
the browser backend module is further configured to execute the first set of instructions to produce one or more data structures in memory;
the forward transformer module is further configured to render the second set of instructions, which when executed by the client application cause the client computer to generate the one or more data structures in memory on the client computer.

12. The computer of claim 10, wherein:
the forward transformer module is further configured to render the second set of instructions, which when executed by the client application causes the client application to validate the client application and send a dynamic client credential;
the computer further comprises a transaction module configured to:
receive the dynamic client credential from the client application;
verify the dynamic client credential is correct.

13. The computer of claim 10, wherein:
the computer comprises a transaction module configured to:
receive a first request for a first intermediary credential to verify that the computer is a valid intermediary computer;
receive a second request for a second intermediary credential, wherein the first request is different than the second request;
the forward transformer module is further configured to:
send the first intermediary credential to the client application;
send the second intermediary credential to the client application, wherein the first intermediary credential is different than the second intermediary credential.

14. The computer of claim 10, wherein the forward transformer module is further configured to render the second set of instructions, which when executed by the client application causes the client application to auto-generate data interspersed into keyboard data.

15. The computer of claim 10, wherein:
the browser backend module is further configured to:
intercept, from the server computer, the first set of instructions that included one or more headers;
strip out the one or more headers;
the forward transformer module is further configured to render the second set of instructions, wherein the second set of instructions do not include the one or more headers.

16. The computer of claim 10, wherein:
the browser backend module is further configured to:
receive, from a second web server, a set of supplementary instructions, which the first set of instructions reference and which define a portion of the user interface;
execute the set of supplementary instructions without presenting the portion of the user interface;
the forward transformer module is further configured to render the second set of instructions, which when executed by the client application on the client computer, cause the client computer to present the portion of the user interface to a user, wherein the second set of instructions are different than the set of supplementary instructions.

17. The computer of claim 10 comprising:
a transaction module configured to:
intercept, from the client application, a set of user data;
cache the set of user data;
receive, from the client application, a request to be sent to the server computer;
a reverse transformer module configured to:
generate a modified request based on the request and the set of user data;
send the modified request to the server computer.

18. The computer of claim 10, wherein:
the forward transformer module is further configured to send the second set of instructions to the client application through a persistent secure socket connection;
the computer comprises a transaction module configured to:
receive, from the client application, a request, which is not based on a URL, to perform a process and return a result, though the persistent secure socket connection;
perform the process;
send the result to the client application, through the persistent secure socket connection.

19. The computer of claim 10, wherein the browser backend module is further configured to generate one or more DOM maps in memory in response to executing the first set of instructions.

\* \* \* \* \*